United States Patent
Atmur et al.

(10) Patent No.: US 10,203,022 B2
(45) Date of Patent: *Feb. 12, 2019

(54) ELLIPTICALLY INTERFACING WOBBLE MOTION GEARING SYSTEM AND METHOD

(71) Applicant: The Boeing Company, Chicago, IL (US)

(72) Inventors: Robert J. Atmur, Whittier, CA (US); William Patrick Sargent, Fullerton, CA (US)

(73) Assignee: The Boeing Company, Chicago, IL (US)

( * ) Notice: Subject to any disclaimer, the term of this patent is extended or adjusted under 35 U.S.C. 154(b) by 226 days.

This patent is subject to a terminal disclaimer.

(21) Appl. No.: 14/932,901

(22) Filed: Nov. 4, 2015

(65) Prior Publication Data

US 2017/0122409 A1     May 4, 2017

(51) Int. Cl.
*F16H 1/32* (2006.01)
*F16H 55/08* (2006.01)
(Continued)

(52) U.S. Cl.
CPC ......... *F16H 1/321* (2013.01); *F16H 55/0873* (2013.01); *F16H 55/17* (2013.01);
(Continued)

(58) Field of Classification Search
CPC ..................................................... F16H 1/321
See application file for complete search history.

(56) References Cited

U.S. PATENT DOCUMENTS

| 37,165 A | 12/1862 | Gary |
| 1,611,981 A | 12/1926 | Amberg |

(Continued)

FOREIGN PATENT DOCUMENTS

| CH | 233459 A | 7/1944 |
| CN | 2276093 Y | 3/1998 |

(Continued)

OTHER PUBLICATIONS

U.S. Patent and Trademark Office, Non-Final Office Action in U.S. Appl. No. 14/989,760, dated Sep. 21, 2017, 40 pages.

(Continued)

*Primary Examiner* — Tisha D Lewis
(74) *Attorney, Agent, or Firm* — Kolisch Hartwell, P.C.

(57) ABSTRACT

A wobble plate drive system may include a stator having a central axis and a plurality of stator teeth disposed on an inner cylindrical surface. The system may further include a wobble plate having a wobble axis disposed at a non-zero angle relative to the central axis, an outer cylindrical surface, and an upper annular surface. A plurality of wobble teeth may be disposed on the outer cylindrical surface and a plurality of face teeth may be disposed on the upper annular surface. The system may further include an output gear having an output axis substantially aligned with the central axis and a lower annular surface. A plurality of output teeth may be disposed on the lower annular surface. The wobble plate may be configured to rotate, the plurality of wobble teeth may be configured to engage with the plurality of stator teeth, and the plurality of face teeth may be configured to engage with the plurality of output teeth as the wobble plate nutates around the stator.

20 Claims, 26 Drawing Sheets

(51) Int. Cl.
*F16H 55/17* (2006.01)
*H02K 41/06* (2006.01)

(52) U.S. Cl.
CPC .......... *H02K 41/06* (2013.01); *H02K 41/065* (2013.01); *F16H 2055/173* (2013.01)

(56) References Cited

U.S. PATENT DOCUMENTS

| | | |
|---|---|---|
| 2,275,827 A | 3/1942 | Plensler |
| 2,458,983 A | 1/1949 | Dunn |
| 2,509,391 A | 5/1950 | Hansen et al. |
| 2,699,690 A | 1/1955 | Kobler |
| 2,703,370 A | 3/1955 | Steensen |
| 2,857,536 A | 10/1958 | Light |
| 2,866,110 A | 12/1958 | Schön |
| 2,871,382 A | 1/1959 | Bouvier |
| 2,908,191 A | 10/1959 | Sundt |
| 3,117,244 A | 1/1964 | Rosain et al. |
| 3,234,393 A | 2/1966 | Ruschmann |
| 3,249,776 A | 5/1966 | Anderson et al. |
| 3,322,984 A | 5/1967 | Anderson |
| 3,341,726 A | 9/1967 | Brinster et al. |
| 3,428,839 A | 2/1969 | Singleton et al. |
| 3,463,953 A | 8/1969 | Maxwell |
| 3,474,272 A | 10/1969 | Newell |
| 3,525,890 A | 8/1970 | Buchanan, Jr. |
| 3,539,847 A | 11/1970 | Gifford |
| 3,579,276 A | 5/1971 | Newell |
| 3,640,154 A | 2/1972 | Massie |
| 3,918,315 A * | 11/1975 | Rouverol ............ F16H 55/0806 74/462 |
| 4,041,808 A * | 8/1977 | Fickelscher ............ F16H 1/321 475/163 |
| RE29,411 E | 9/1977 | Newell |
| 4,081,702 A | 3/1978 | Neumann |
| 4,108,017 A | 8/1978 | Rouverol |
| 4,330,725 A | 5/1982 | Hintz |
| 4,495,432 A | 1/1985 | Katsuma et al. |
| 4,906,881 A | 3/1990 | Knight |
| 5,111,102 A | 5/1992 | Meeks |
| 5,747,915 A | 5/1998 | Benavides |
| 5,804,898 A | 9/1998 | Kawai |
| 5,820,504 A | 10/1998 | Geralde |
| 5,906,142 A | 5/1999 | Shirasawa |
| 5,954,610 A | 9/1999 | Kamimura |
| 6,568,929 B2 | 5/2003 | Takagi |
| 6,664,711 B2 | 12/2003 | Baudendistel |
| 7,165,473 B2 | 1/2007 | Kobayashi et al. |
| 7,540,865 B2 | 6/2009 | Griffin et al. |
| 7,824,345 B2 | 11/2010 | Euteneuer et al. |
| 7,841,994 B2 | 11/2010 | Skujins et al. |
| 7,850,623 B2 | 12/2010 | Griffin et al. |
| 7,878,984 B2 | 2/2011 | Jacobsen et al. |
| 7,914,466 B2 | 3/2011 | Davis et al. |
| 7,914,467 B2 | 3/2011 | Layman et al. |
| 7,969,055 B2 | 6/2011 | Titus |
| 8,022,331 B2 | 9/2011 | Reynolds et al. |
| 8,048,004 B2 | 11/2011 | Davis et al. |
| 8,048,060 B2 | 11/2011 | Griffin et al. |
| 8,105,246 B2 | 1/2012 | Voeller et al. |
| 8,137,293 B2 | 3/2012 | Zhou et al. |
| 8,169,118 B2 | 5/2012 | Filatov |
| 8,182,465 B2 | 5/2012 | Griffin et al. |
| 8,210,070 B2 * | 7/2012 | Takahashi ............ F16H 1/321 475/163 |
| 8,231,551 B2 | 7/2012 | Griffin et al. |
| 8,257,279 B2 | 9/2012 | Davis et al. |
| 8,368,269 B2 | 2/2013 | Titus |
| 8,376,961 B2 | 2/2013 | Layman et al. |
| 8,377,035 B2 | 2/2013 | Zhou et al. |
| 8,409,114 B2 | 4/2013 | Parins |
| 8,449,526 B2 | 5/2013 | Snyder et al. |
| 8,535,243 B2 | 9/2013 | Shireman |
| 8,551,020 B2 | 10/2013 | Chen et al. |
| 8,551,021 B2 | 10/2013 | Voeller et al. |
| 8,556,914 B2 | 10/2013 | Vrba |
| 8,636,716 B2 | 1/2014 | Griffin et al. |
| 8,646,360 B2 | 2/2014 | Kanai |
| 9,124,150 B2 | 9/2015 | Atmur |
| 9,164,497 B2 | 10/2015 | Cameron et al. |
| 9,427,866 B2 * | 8/2016 | Hasegawa ............... B25J 9/104 |
| 9,768,664 B2 * | 9/2017 | Atmur .................... H02K 7/116 |
| 2009/0064812 A1 | 3/2009 | Gutmann et al. |
| 2010/0224435 A1 | 9/2010 | Yamamori |
| 2013/0319145 A1 | 12/2013 | Shimada |
| 2014/0285072 A1 | 9/2014 | Atmur et al. |
| 2015/0015174 A1 | 1/2015 | Atmur |
| 2015/0024896 A1 * | 1/2015 | Takahashi ............... F16H 1/321 475/162 |
| 2016/0327015 A1 | 11/2016 | Iida et al. |

FOREIGN PATENT DOCUMENTS

| | | |
|---|---|---|
| CN | 203098755 U | 7/2013 |
| CN | 104065202 A | 9/2014 |
| DE | 10028964 A1 | 1/2002 |
| DE | 10237686 A1 | 2/2004 |
| DE | 102009002587 A1 | 10/2010 |
| DE | 10237686 B4 | 4/2013 |
| EP | 0565746 A1 | 10/1993 |
| EP | 2169263 A1 | 3/2010 |
| EP | 2169263 B1 | 10/2011 |
| EP | 2535136 A1 | 12/2012 |
| EP | 2782230 A2 | 9/2014 |
| EP | 2838186 A2 | 2/2015 |
| EP | 2933531 A1 | 10/2015 |
| EP | 3096444 A1 | 11/2016 |
| GB | 2211900 A | 7/1989 |
| GB | 2327998 A | 2/1999 |
| JP | 60017749 A | 1/1985 |
| JP | 2014187867 A | 10/2014 |
| JP | 2015039286 A | 2/2015 |
| WO | 2008149696 A1 | 12/2008 |
| WO | 2011154981 A1 | 12/2011 |
| WO | 2014051131 A1 | 4/2014 |
| WO | 2014118284 A2 | 8/2014 |

OTHER PUBLICATIONS

European Patent Office, Extended European Search Report in European Patent Application No. 17167409.6-1809, dated Sep. 22, 2017, 9 pages.

Antonio S de Castro; Exploring a rehnomic system; Dec. 23, 1999, retrieved from the internet at https://arxiv.org/pdf/physics/9912049.pdf, 6 pages.

Machine Design, Sometimes it Pays to be Eccentric, May 18, 2000, retrieved from the internet on Feb. 18, 2015 from http://machinedesign.com/archive/sometimes-it-pays-be-eccentric, 7 pages.

Machine Design, Flexible gears minimize gearhead backlash for life, Jun. 7, 2001, retrieved from the internet on Feb. 18, 2015 from http://machinedesign.com/archive/flexible-gears-minimize-gearhead-backlash-life, 4 pages.

Machine Design, Flatter reducer makes waves, Jan. 24, 2002, retrieved from the internet on Feb. 18, 2015 from http://machinedesign.com/archive/flatter-reducer-makes-waves, 4 pages.

Carl A. Nelson et al., Similarity and Equivalence of Nutating Mechanisms to Bevel Epicyclic Gear Trains for Modeling and Analysis, Journal of Mechanical Design, Mar. 2005, vol. 127, 9 pages.

M. Elmoznino et al., An electro-mechanical Pericyclic CVT (P-CVT), 12th IFToMM World Congress, Besancon, France, Jun. 18-21, 2007, 6 pages.

Francesco Fasso et al., An elemental overview of the nonholonomic Noether theorem, Oct. 18, 2009, 11 pages.

Zeke Susman, Harmonic Drive, EVE5320 Mechatronics, Department of Electrical and Computer Engineering, Utah State University, Mar. 11, 2010, retrieved from the internet on Feb. 18, 2015 from http://mechatronics.ece.usu.edu/ece5320/Schedule/hw01-2010/hw1_Zeke_Susman_a.ppt, 27 pages.

(56) References Cited

OTHER PUBLICATIONS

Tom Lipton, Wabble Drive Proof of Principle, Oct. 19, 2012, retrieved from the internet on Feb. 19, 2015 from http://oxtool.blogspot.com/2012/10/wabble-drive-proof-of-principle.html, 8 pages.
Harmonic Drive Systems, Inc., Strengths of HarmonicDrive®, retrieved from the internet on Feb. 18, 2015 from http://www.hds.co.jp/english/company/business/strength/, 5 pages.
Francesco Fasso et al., Conservation of energy and momenta in nonholonomic systems with affine constraints, May 5, 2015, 16 pages.
European Patent Office, Extended European Search Report in European Patent Application No. 16156922.3-1806, dated Sep. 30, 2016, 6 pages.
European Patent Office, Extended European Search Report in European Patent Application No. 16196546.2-1762, dated May 3, 2017, 9 pages.
European Patent Office, Extended European Search Report in European Patent Application No. 16194812.0-1762, dated Jun. 7, 2017, 8 pages.
U.S. Patent and Trademark Office, Non-Final Office Action in U.S. Appl. No. 15/585,544, dated Jul. 11, 2018, 68 pages.

\* cited by examiner

ELLIPTICALLY INTERFACING WOBBLE MOTION GEARING SYSTEM AND METHOD

FIELD

This disclosure relates generally to electric motors. More particularly, embodiments of the present disclosure relate to a wobble motion gearing system.

BACKGROUND

Electric motors create mechanical energy from electromagnetic energy. An alternating current (AC) motor generally includes a rotor and a stationary stator. The stationary stator usually has windings of electrical wires which carry an alternating current which produces a rotating magnetic field. Some rotors include ferromagnetic components which respond to the rotating magnetic field generated by the stator, and as the magnetic field of the stator rotates the rotor will physically rotate. By coupling the rotor to an output shaft the electromagnetic energy of the AC current is converted to the rotational mechanical energy of the output shaft.

Two or more gears can be used to create a mechanical advantage through a gear ratio. There are many ways to arrange gears so that a single rotation of a first gear will result in more or less than one rotation of a second gear in the same amount of time. The gear ratio is the ratio of these two rotations. In the case where the second gear rotates less than the first gear the gear combination could be said to provide a gear reduction. In certain applications it is desirable to have an AC motor with a very high gear ratio, where the gear reduction takes place in the smallest possible volume. For example, an actuator that converts many oscillations of the electrical current into a single rotation of the output shaft could have very fine control.

Historically, wobble plate drive mechanisms have seemed a promising route toward a motor having a high gear ratio within a small volume. Examples of such wobble plate drive mechanisms are disclosed in U.S. Pat. Nos. 9,281,736 and 9,124,150. Older systems are disclosed in U.S. Pat. Nos. 2,275,827 and 3,249,776. The disclosures of these and all other publications referenced herein are incorporated by reference in their entirety for all purposes.

In a wobble plate mechanism, one of the gears, for example a rotor gear, nutates around the other gear, for example a stator gear. If the number of gear teeth on the rotor gear and the stator gear are different by one, then such a system would have a gear ratio equal to the number of teeth on the stator gear.

In principle, the gear ratios in wobble plate drive mechanisms could be quite high. A theoretical wobble plate drive mechanism only using two gears may achieve a very high ratio, in a small volume. However, in practice, efficient and effective wobble plate drive systems have proved elusive, because the forces involved often lead to one or more of disengagement of the mechanism, unacceptable levels of vibration, or inefficiency due to friction.

SUMMARY

An improved wobble plate drive system is disclosed, in various embodiments. These wobble plate drive systems may include a stator having a central axis and a plurality of stator teeth disposed on an inner cylindrical surface. The system may further include a wobble plate having a wobble axis disposed at a non-zero angle relative to the central axis, an outer cylindrical surface, and an upper annular surface. A plurality of wobble teeth may be disposed on the outer cylindrical surface and a plurality of face teeth may be disposed on the upper annular surface. The system may further include an output gear having an output axis substantially aligned with the central axis and a lower annular surface. A plurality of output teeth may be disposed on the lower annular surface. The wobble plate may be configured to rotate, the plurality of wobble teeth may be configured to engage with the plurality of stator teeth, and the plurality of face teeth may be configured to engage with the plurality of output teeth as the wobble plate nutates around the stator.

A method for operating a wobble plate drive mechanism may include nutating a rotor about a fulcrum. The rotor may include a plurality of wobble teeth disposed on an outer cylindrical surface and a plurality of face teeth disposed on an upper annular surface. The method may include impelling a first side of the rotor to press against a stator at a first location. The stator may include a plurality of stator teeth. The method may include impelling a second side of the rotor to press against an output plate at a second location. The second location may be on an opposite side of the rotor relative to the first location. The output plate may include a plurality of output teeth. The method may include engaging the wobble teeth with the stator teeth and the face teeth with the output teeth as the rotor nutates about the fulcrum.

A wobble plate for use in a nutating wobble plate drive system may include a wobble axis, an outer cylindrical surface parallel to the wobble axis, and an upper annular surface. The wobble plate may include a set of wobble teeth disposed on the outer cylindrical surface. The wobble teeth may extend from the outer cylindrical surface away from the wobble axis. The wobble plate may further include a set of face teeth disposed on the upper annular surface. At least one of the set of wobble teeth may have a cross-sectional shape at a location distal from the outer cylindrical surface. The cross-sectional shape may be at least partially defined by a compound involute of a circle and an ellipse.

The present disclosure provides various apparatuses and methods of use thereof. In some embodiments, a device may include a stator, a wobble plate/rotor, and an output plate/output gear. In some embodiments, the wobble plate/rotor may nutate around the stator and the output plate/output gear as the output plate/output gear rotates. In some embodiments, each of the stator and the wobble plate/rotor may include a set of teeth having shapes designed to limit eccentric forces. In some embodiments, the teeth of the wobble plate/rotor and the teeth of the stator may be designed to engage via a rolling contact that may limit losses to friction. Features, functions, and advantages may be achieved independently in various embodiments of the present disclosure, or may be combined in yet other embodiments, further details of which can be seen with reference to the following description and drawings.

DESCRIPTION

Various embodiments of apparatuses and methods relating to a wobble plate gear interface are described below and illustrated in the associated drawings. Unless otherwise specified, an apparatus or method and/or their various components may, but are not required to, contain at least one of the structure, components, functionality, and/or variations described, illustrated, and/or incorporated herein. Furthermore, the structures, components, functionalities, and/or variations described, illustrated, and/or incorporated herein in connection with the present teachings may, but are not required to, be included in other similar apparatuses or methods. The following description of various embodiments is merely exemplary in nature and is in no way intended to limit the disclosure, its application, or uses. Additionally, the advantages provided by the embodiments, as described below, are illustrative in nature and not all embodiments provide the same advantages or the same degree of advantages.

The following describes selected aspects of exemplary wobble plate drive systems and methods. The examples are intended for illustration and should not be interpreted as limiting the entire scope of the present disclosure. The description may include one or more distinct disclosures, and/or contextual or related information, function, and/or structure.

Figure 1:
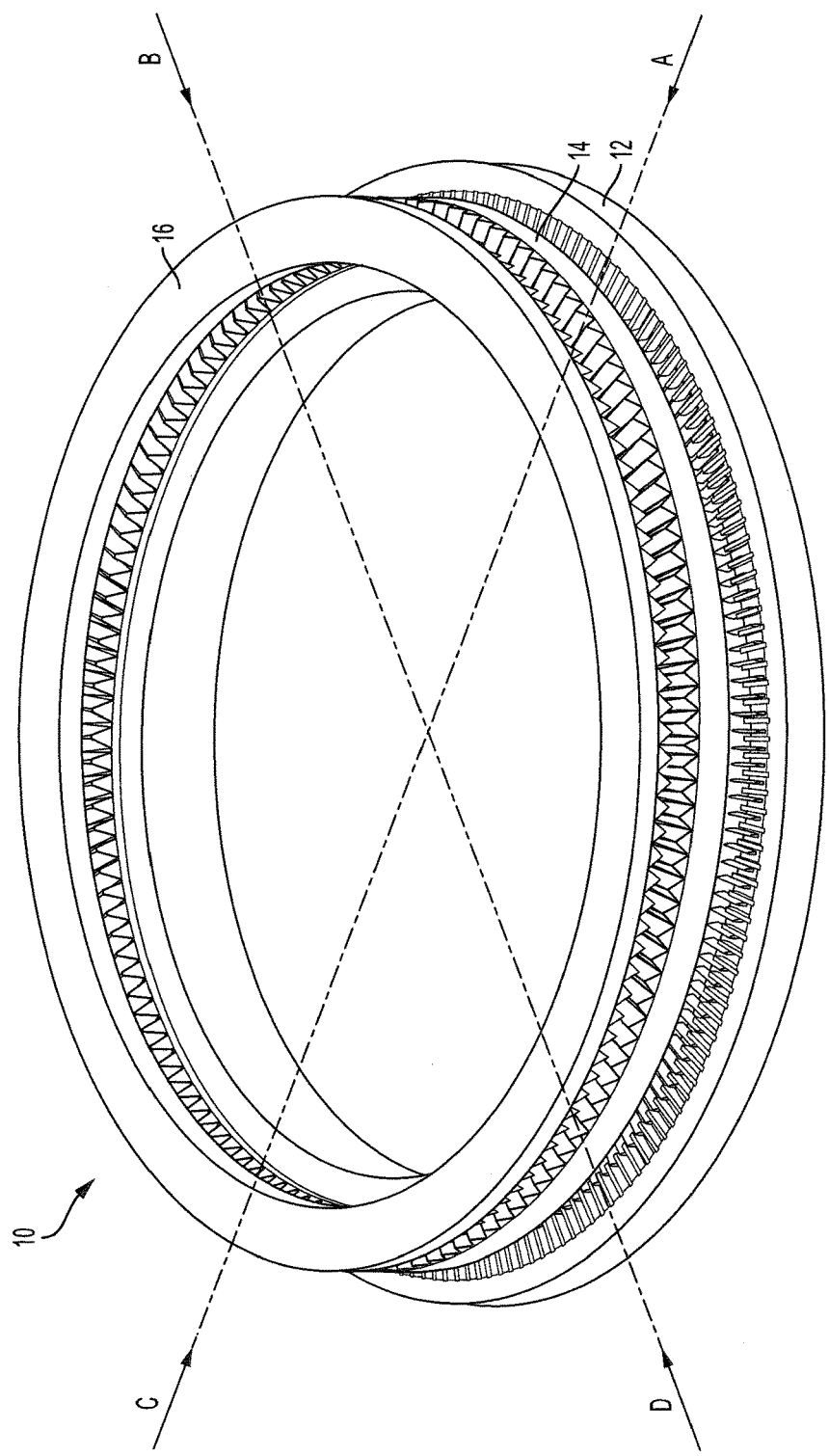
FIG. 1 is a diagrammatic representation of an isometric view of an embodiment of a wobble plate drive system.
Figure 2:
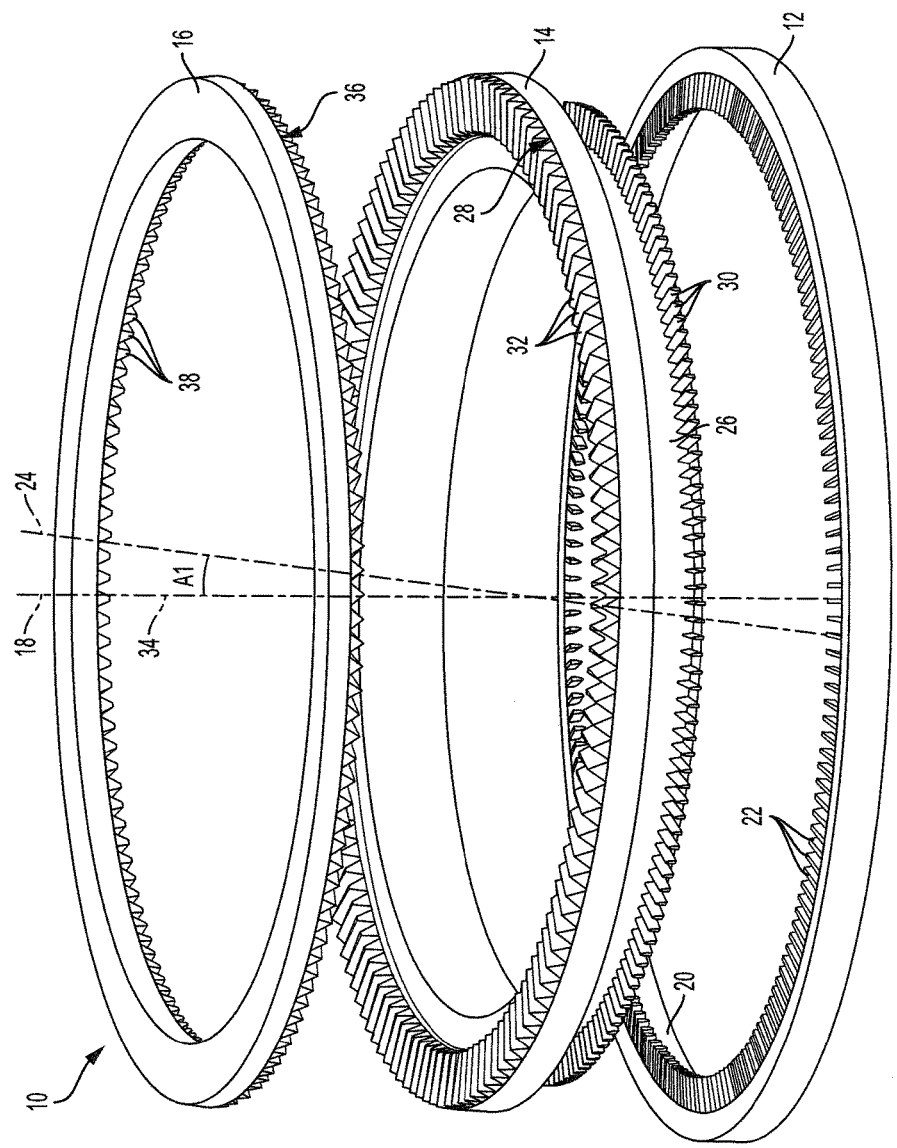
FIG. 2 is a diagrammatic representation of an isometric exploded view of the drive system of FIG. 1.

FIG. 1 is an isometric view of an exemplary embodiment of a wobble plate drive system, generally indicated at 10. FIG. 2 is an exploded isometric view of wobble plate drive system 10. Wobble plate drive system 10 may include a stator or stator gear 12, a wobble plate, wobble gear, or rotor 14, and an output plate or output gear 16. With reference to FIG. 2, the stator may have a central axis 18, an inner cylindrical surface 20 substantially parallel to the central axis, and a plurality of stator teeth 22 disposed on the inner cylindrical surface.

With regard to describing the inner cylindrical surface 20 as parallel to the central axis, one may describe a surface as parallel to a straight line if every point on the surface in question includes at least one line though that point that is parallel to said straight line. For example, the x-y Cartesian plane is parallel to the straight line passing through the pair of points having (x,y,z) coordinates of (0,0,1) and (1,0,1) because every point in the x-y plane, for example arbitrary point (a,b,0), has a line passing through it and another point, for example the point (a+1,b,0), that is parallel to the straight line passing through (0,0,1). These two straight lines share a common plane and will never cross.

In another example, the inner surface of a cylinder is parallel to the central symmetry axis of the cylinder because every point on the inner surface of the cylinder has a line passing through that point that is parallel to the central symmetry axis, namely, a line on the inner cylinder that runs longitudinally along the cylinder but does not wrap azimuthally around the cylinder. This line and the central symmetry axis share a common plane and will never cross.

Wobble plate 14 may have a wobble axis 24 disposed at a non-zero wobble angle A1 relative to the central axis.

Wobble plate 14 may have an outer cylindrical surface 26 substantially parallel the wobble axis and an upper annular surface 28. A plurality or set of wobble teeth 30 may be disposed on the outer cylindrical surface and a plurality or set of face teeth 32 may be disposed on the upper annular surface.

Output gear 16 may have an output axis 34 substantially aligned with the central axis 18 and a lower annular surface 36. A plurality of output teeth 38 may be disposed on the lower annular surface 36.

Wobble plate 14 may be configured to nutate around stator 12. That is, the wobble axis 24 may precess around the central axis 18 of the stator in a manner so that angle A1 between the two axes is relatively constant. As the wobble plate nutates, a first location of the point on the wobble plate that is farthest from the output plate 16 may move in a circle around the stator. During nutation a second location of the point on the wobble plate that is closest to the output plate may move in a circle around the output gear 16. The wobble plate may be configured to rotate as it nutates around the stator.

In the case where the wobble plate is configured to rotate as it nutates around the stator, the plurality of wobble teeth 30 may be configured to engage with the plurality of stator teeth 22, and the plurality of face teeth 32 may be configured to engage with the plurality of output teeth 38.

Figure 3:
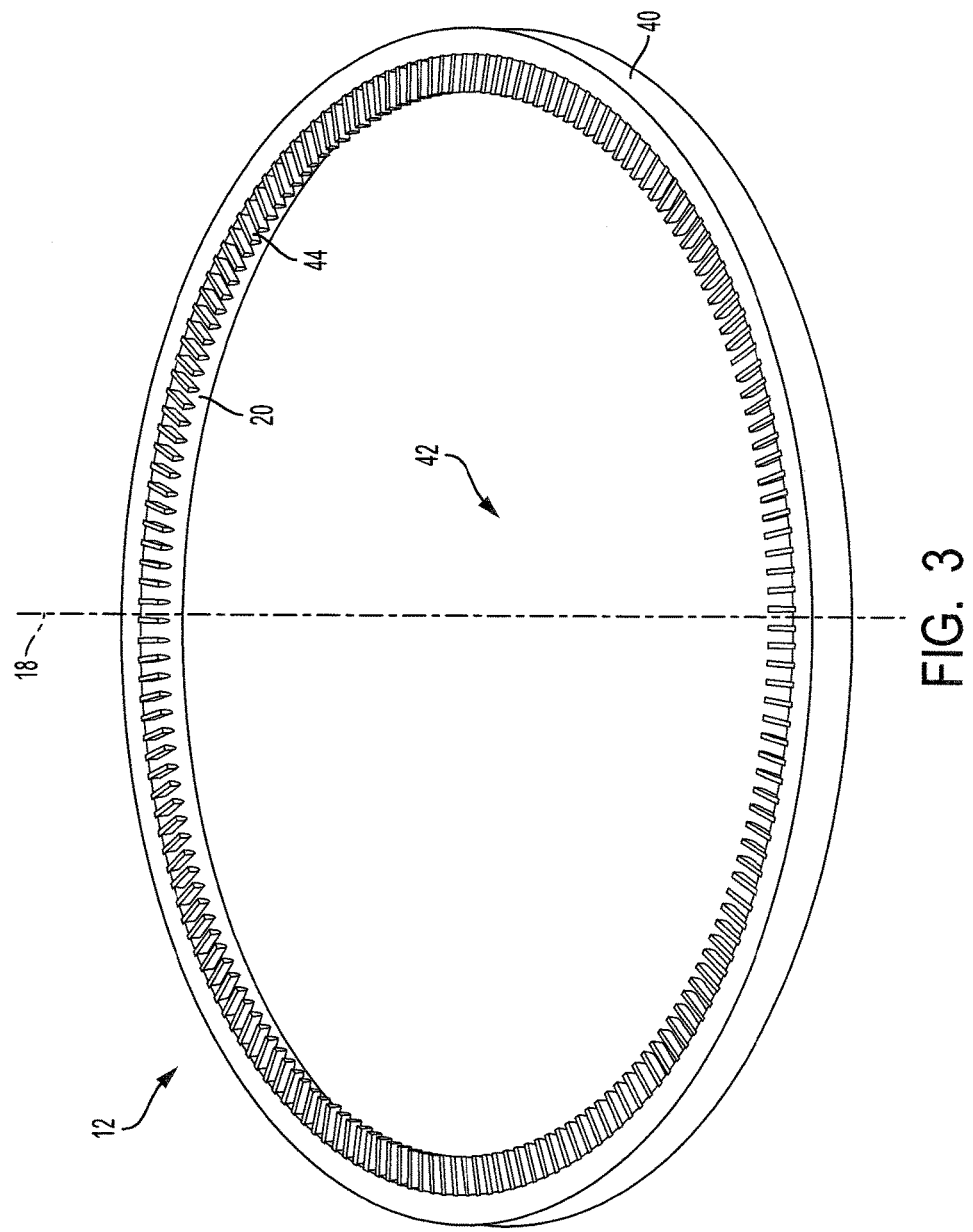
FIG. 3 is a diagrammatic representation of an isometric view of a stator gear of the drive system of FIG. 1, showing a plurality of stator teeth.

FIG. 3 is an isometric view of stator 12. Stator 12 may have a base 40 and base 40 may include the inner cylindrical surface 20. Apart from the inner cylindrical surface 20, base 40 may have any appropriate shape. For example, base 40 may include attachment points configured to operatively couple stator 12 to the rest of whatever device is using wobble plate drive system 10. Stator 12 may be stationary within the context of that device.

The inner cylindrical surface 20 may define an interior volume 42. Interior volume 42 may be configured to accommodate some or all of wobble plate 14 as can be seen in FIG. 1 above and FIGS. 17-20 below.

The plurality of stator teeth 22 may project from the inner cylindrical surface into interior volume 42 toward the central axis 18. A count of the plurality of stator teeth may be any appropriate number. In the exemplary embodiment depicted in FIG. 3 there are 181 stator teeth.

Figure 4:
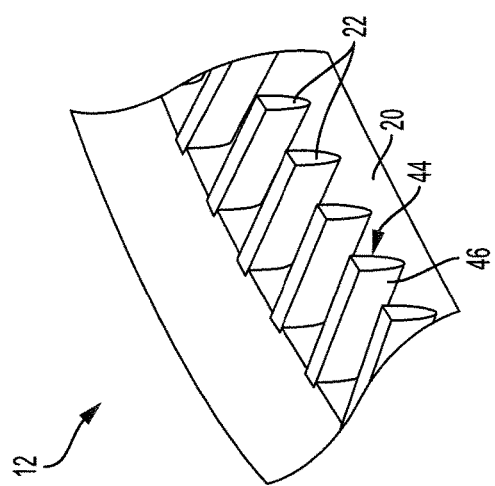
FIG. 4 is a diagrammatic representation of a detailed view of FIG. 3, showing several stator teeth of the stator gear of FIG. 4.

FIG. 4 is a detailed view of stator 12 showing several stator teeth 22 disposed on inner cylindrical surface 20. Each stator tooth may include a first driving face 44 which may also be seen in FIG. 3. The first driving face 44 may extend from proximate the inner cylindrical surface into interior volume 42. First driving face 44 may be planar, composed of more than one plane, or may be composed of one or more surfaces with curvature.

On the opposite side of a stator tooth 22 from the first driving face may be a second driving face 46. The second driving face 46 may extend from proximate the inner cylindrical surface 20 into the interior volume of the stator. Second driving face 46 may be planar, composed of more than one plane, or may be composed of one or more surfaces with curvature.

Figure 5:
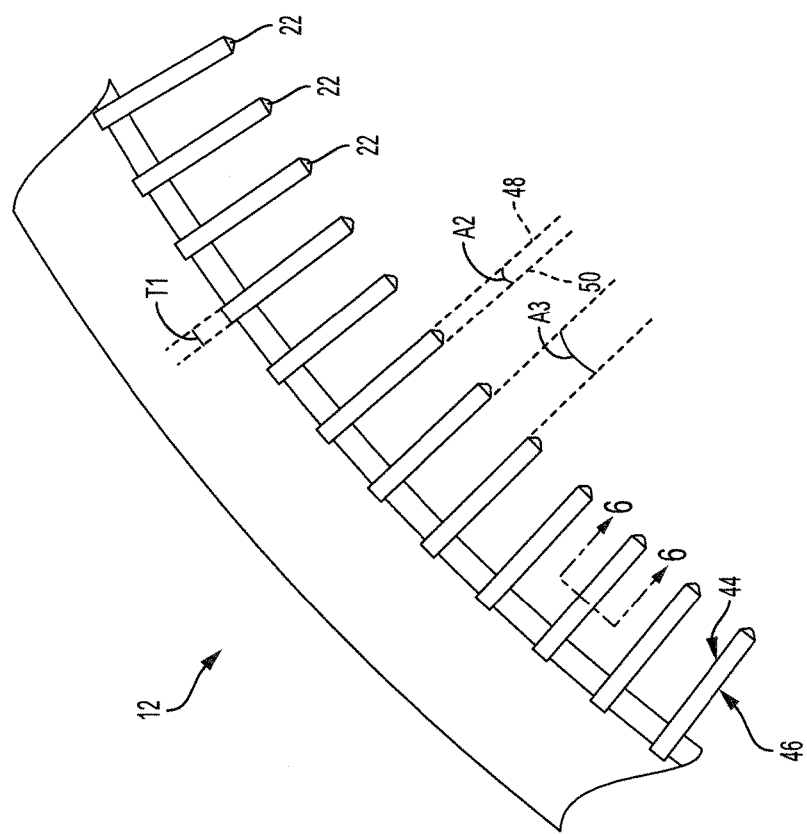
FIG. 5 is a diagrammatic representation of a top plan view of the stator gear of FIG. 4, showing a subset of stator teeth.

FIG. 5 is a top plan view of stator 12, showing a subset of stator teeth 22. Each stator tooth may have a portion that is wedge-shaped in the following sense: The first driving face 44 of a stator tooth may include a line 48 that is in a plane perpendicular to the central axis 18 and passes through the central axis 18. The second driving face 46 may contain a line 50 that is in a plane perpendicular to the central axis and passes through the central axis. Lines 48 and 50 may be said to be radial lines. Thus, each stator tooth may have an angular width A2 that may be the maximum angular distance between a first and second driving faces on the stator tooth, as measured in an angular direction around the central axis 18.

Each stator tooth may have a portion for which the angular width A2 is substantially constant along the radial extent of each stator tooth, as measured in a radial direction away from the central axis 18. In this case a linear thickness T1 of each stator tooth may grow linearly with increasing radial distance from the central axis 18, the linear thickness measured in an azimuthal direction around the central axis.

A pair of adjacent stator teeth may have an angular separation or spacing A3 that may be the minimum angular distance between the two adjacent teeth, as measured in the azimuthal or angular direction around the central axis. The angular width A2 of a single stator tooth may be less than one half of the angular separation A3 between any two adjacent stator teeth.

Figure 6:
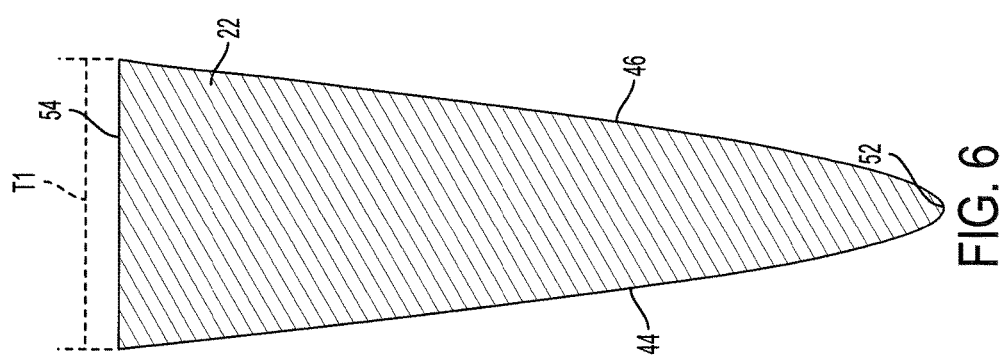
FIG. 6 is a diagrammatic representation of a cross-sectional view of a single stator tooth, taken along plane 6-6 in FIG. 5.

FIG. 6 is a cross-sectional view, taken along plane 6-6 in FIG. 5, of an exemplary single stator tooth 22. One or both of the first and second driving faces 44 and 46 may be defined by a compound involute of a circle and an ellipse. That is, the curve of the second driving face 46 shown in FIG. 6 may be defined by the equation:

$$y = C(\tan(\varphi) - \varphi)^D$$

where C is a constant which may be proportional to the radius of wobble plate 14, $\varphi$ may take values from 0 to $$\frac{\pi}{2}$$

radians, and D may be a positive constant less than 1. D may have a value of approximately 0.65, though other values are also possible. The curve of the second driving face 46 shown in FIG. 6 may be the projection of a virtual ellipse onto the tooth location for all angles between 0 and $2\pi$ radians.

The curve of first driving face 44 may be a mirror image of the curve of second driving face 46, reflected across a plane that is vertical in the view of FIG. 6 and perpendicular to the plane of FIG. 6. That is, the first driving face may be defined by the compound involute of a circle and an ellipse. The first and second driving faces 44 and 46 may meet smoothly at an apex 52 of each stator tooth.

A connecting surface 54 may join the first and second driving faces on a side of a stator tooth on a side opposite the apex 52. The thickness T1 of connecting surface 54, as measured in a direction around the central axis of the stator, may grow linearly with radial distance from the central axis.

Figure 7:
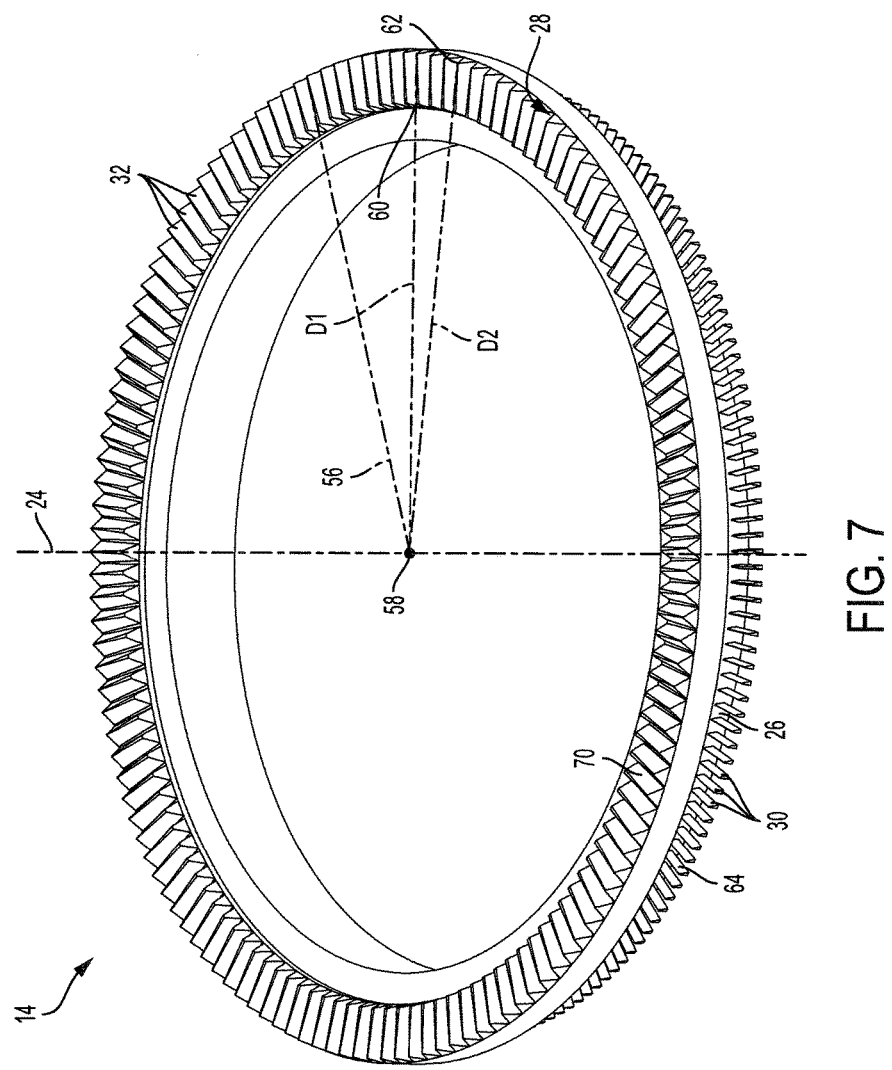
FIG. 7 is a diagrammatic representation of an isometric view of a wobble plate of the drive system of FIG. 1, showing a plurality of wobble teeth and a plurality of face teeth.

FIG. 7 is an isometric view of a wobble plate or rotor 14. Wobble plate 14 may be an annulus as depicted in FIG. 7 or it may be a solid disk. Wobble plate 14 may have any suitable structure interior to the pluralities of wobble teeth and face teeth 30 and 32. Wobble plate 14 may be operably coupled to a fulcrum (not shown) proximate the wobble axis 24. The fulcrum may be stationary within the context of whatever device houses wobble plate drive system 10. Wobble plate 14 may be configured to nutate around stator 12.

Some or all of wobble plate 14 may be configured to fit within the interior volume 42 of stator 12. The plurality of wobble teeth 30 may project from the outer cylindrical surface 26 away from the wobble axis 24. A count of the plurality of wobble teeth may be any appropriate number. In the exemplary embodiment depicted in FIG. 7 there are 180 wobble teeth. The count of wobble teeth may be more or less than the count of stator teeth. The count of wobble teeth may be different than the count of stator teeth by any number, including zero, one, and numbers larger than one.

Upper annular surface 28 may be a frustoconical surface. That is, the upper annular surface 28 may be a portion of a conical surface, or a surface of a cone. The upper annular frustoconical surface may be configured so that a center of mass 58 of the wobble plate is a vertex of the frustoconical surface. Upper annular surface 28 may be concave. Each point on the upper annular surface may have a conical line, depicted at 56 in FIG. 7, that lies within the upper annular surface and is extendable through the center of mass 58 of the wobble plate 14. Each of the plurality of face teeth 32 may have a proximal end 60 disposed a distance D1 away from the center of mass 58 of the wobble plate and a distal end 62 disposed a distance D2 away from the center of mass 58 of the wobble plate, with distance D2 being greater than D1.

A count of the plurality of face teeth may be any appropriate number. The count of face teeth may be more, less, or the same as a count of the plurality of output teeth. The count of face teeth may be more, less, or the same as the count of wobble teeth. In the exemplary embodiment depicted in FIG. 7 there are 135 face teeth.

Figure 8:
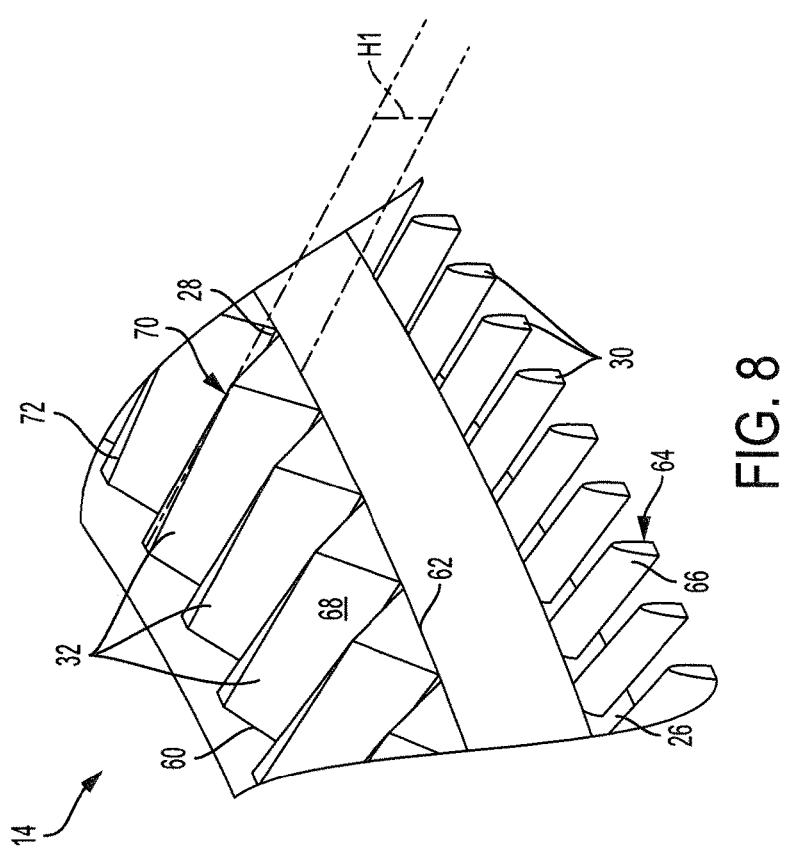
FIG. 8 is a diagrammatic representation of a detailed view of FIG. 7, showing several wobble teeth and several face teeth of the wobble plate of FIG. 7.

FIG. 8 is a detailed view of wobble plate 14, showing several wobble teeth 30 disposed on outer cylindrical surface 26 and several face teeth 32 disposed on upper annular surface 28. Each wobble tooth 30 may have a first driven face or engaging surface 64 which may also be seen in FIG. 7. The first driven face may extend from proximate the outer cylindrical surface 26 away from the wobble axis. First driven face 64 may be planar, composed of more than one plane, or may be composed of one or more surfaces with curvature. The first driven face 64 may be configured to engage with the first diving face 44 of a stator tooth as the wobble plate 14 nutates around the stator in a first nutation direction.

Each wobble tooth 30 may have a second driven face or engaging surface 66 opposite the first driven face 64. The second driven face 66 may extend from proximate the outer cylindrical surface 26 away from the wobble axis. Second driven face 66 may be planar, composed of more than one plane, or may be composed of one or more surfaces with curvature. The second driven face 66 may be configured to engage with the second driving face 46 of a stator tooth as the wobble plate nutate in a second nutation direction.

Each face tooth 32 may have a third driving face 68 extending from the proximal end 60 to the distal end 62 of the face tooth. Third driving face 68 may be planar, composed of more than one plane, or may be composed of one or more surfaces with curvature.

Each face tooth 32 may have a fourth driving face 70 extending from the proximal end 60 to the distal end 62 of the face tooth. The fourth driving face may be seen more clearly in FIG. 7. Fourth driving face 70 may be planar, composed of more than one plane, or may be composed of one or more surfaces with curvature.

Each face tooth 32 may have an upper surface 72 extending from the third driving face 68 to the fourth driving face 70. The upper surface 72 may define a face tooth height H1 as the distance between the upper annular surface 28 and the upper surface 72 of the face tooth, as measured along a direction parallel to the wobble axis. The face tooth height H1 may or may not be constant along a face tooth. The face tooth height H1 may have a minimum value proximate the proximal end 60 of a face tooth.

Figure 9:
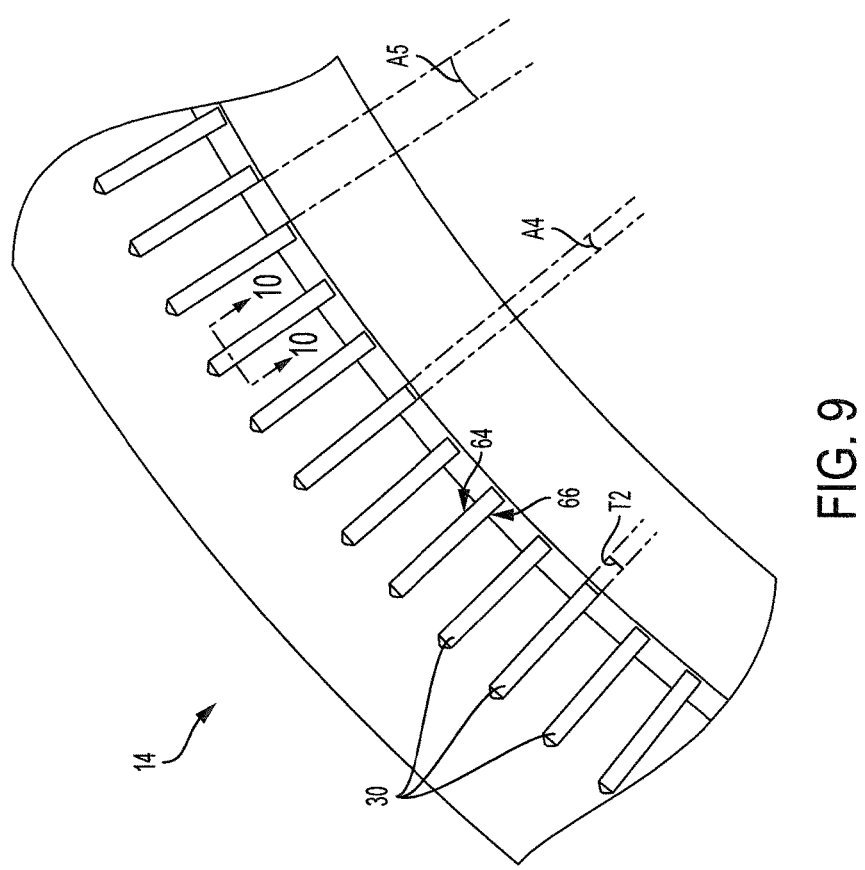
FIG. 9 is a diagrammatic representation of a bottom plan view of the wobble plate of FIG. 7, showing a subset of wobble teeth.

FIG. 9 is a bottom plan view of wobble plate 14, showing a subset of wobble teeth 30. Each wobble tooth may have a portion that is wedge-shaped. That is, each wobble tooth may have an angular width A4 that may be the maximum angular distance between the first and second driven faces 64 and 66 of the wobble tooth, as measured in an angular direction around the wobble axis, and that angular width may be constant along the wobble tooth. In this case a linear thickness T2 of the wobble tooth may grow linearly with increasing radial distance from the wobble axis, as measured spatially around the wobble axis.

Angular width A4 may be measured between radial lines contained within the first and second driving faces that are extendable through the wobble axis 24. The first and second driving faces may contain lines that are extendable through a center of mass of the wobble plate.

A pair of adjacent wobble teeth may have an angular separation A5 that may be the minimum angular distance between the two adjacent teeth, as measured in the angular direction around the central axis. The angular width A4 of a single wobble tooth may be less than one half of the angular separation A5 between any two adjacent wobble teeth.

Figure 10:
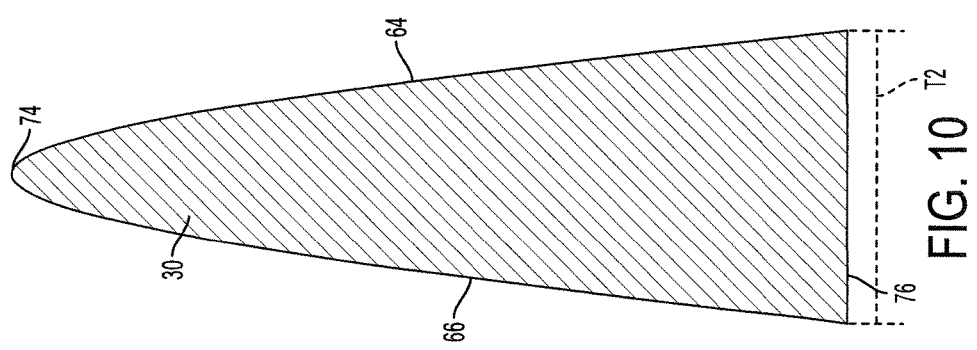
FIG. 10 is a diagrammatic representation of a cross-sectional view of a single wobble tooth, taken along plane 10-10 in FIG. 9.

FIG. 10 is a cross-sectional view, taken along plane 10-10 in FIG. 9, of an exemplary single wobble tooth 30. Regarding the wobble tooth cross-sectional shape depicted, one or both of the first and second driven faces 64 and 66 may be defined by a compound involute of a circle and an ellipse, as described in reference to FIG. 5. In an example, each tooth of the set of wobble teeth may have two engaging surfaces 64 and 66 defined by a compound involute of a circle and an ellipse.

The first and second driven faces 64 and 66 may meet smoothly at an apex 74 of each wobble tooth. The curve of the first driven face 64 may be a mirror image of the curve of the second driven face, reflected across a plane that is vertical in the view of FIG. 10, perpendicular to the plane of FIG. 10, and passes through apex 74.

A connecting surface 76 may join the first and second driven faces on a side of the wobble tooth opposite the apex 74. The linear thickness T2 of connecting surface 76, as measured in a direction around the wobble axis, may grow linearly with distance away from the wobble axis.

Figure 11:
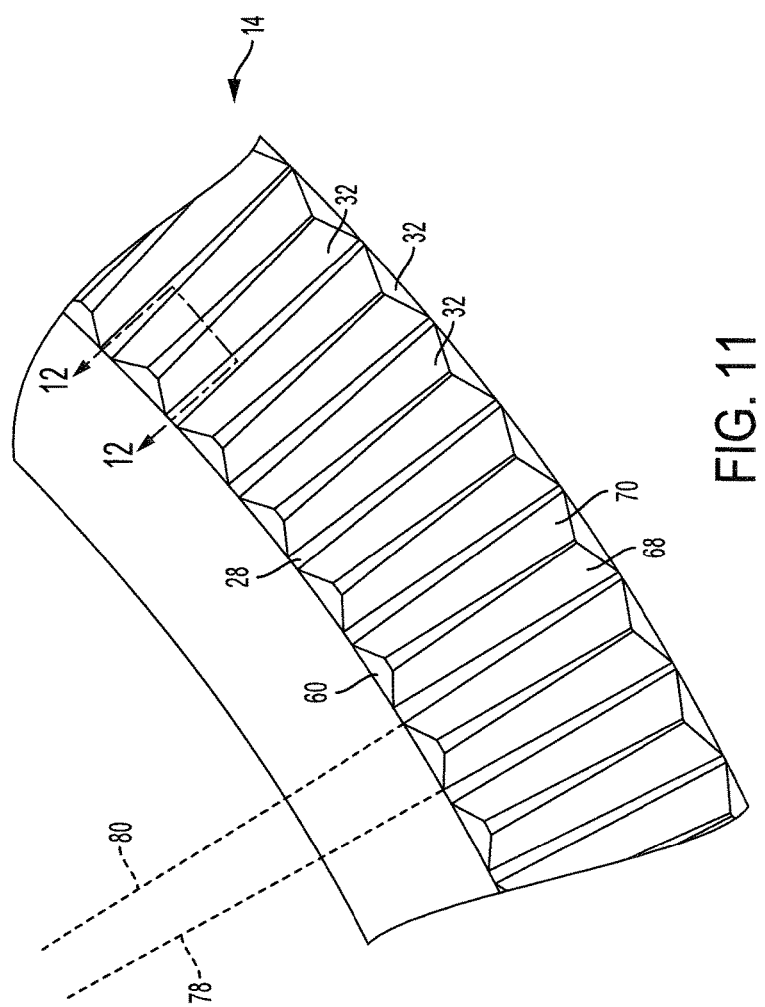
FIG. 11 is a diagrammatic representation of a top plan view of the wobble plate of FIG. 7, showing a subset of face teeth.

FIG. 11 is a top plan view of wobble plate 14, showing a subset of face teeth 32. Each face tooth may have a wedge-shaped footprint on the upper annular surface 28. That is, a line 78 made by the junction of the third driving face 68 with the upper annular surface 28 may extend through the wobble axis. Another line 80 made by the junction of the fourth driving face 70 with the upper annular surface 28 may extend through the wobble axis. Lines 78 and 80 may extend through the center of mass of the wobble plate.

Figure 12:
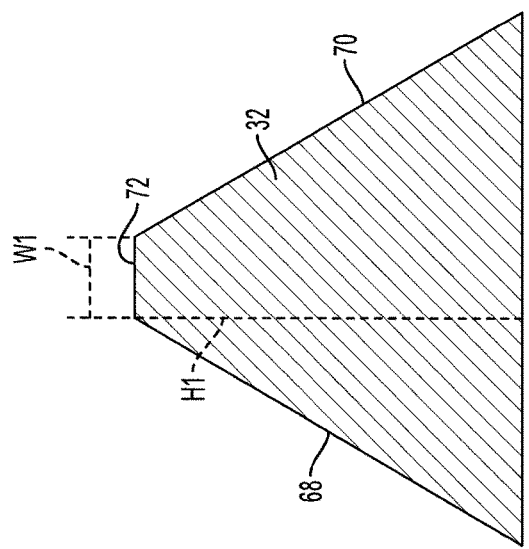
FIG. 12 is a diagrammatic representation of a cross-sectional view of a single face tooth, taken along plane 12-12 in FIG. 11.

FIG. 12 is a cross-sectional view, taken along plane 12-12 in FIG. 11, of an exemplary single face tooth 32. One or both of the third and fourth driving faces 68 and 70 may be substantially planar. The upper surface 72 of each face tooth may have a width W1. The width of the upper surface may vary along the face tooth, see for example in FIG. 11. The width W1 may have a maximum value proximate the proximal end 60 of a face tooth, see FIG. 11. The width W1 may vary along the face tooth as the height H1 varies.

By configuring the wobble teeth and the face teeth to be wedge-shaped and the upper annular surface to be conical, contact forces exerted by the wobble and face teeth and on the face and wobble teeth may be substantially perpendicular to radial lines extending from the center of mass of the wobble plate. In particular, the contact forces exerted on the wobble teeth by another gear in the nutating wobble plate drive system, for example the stator, will be in directions substantially perpendicular to a line parallel to the wobble axis and radial lines extending from points of contact to the wobble axis. This may ensure that the motion of the wobble plate is not eccentric, that is, that the center of mass of the wobble plate does not travel, within the context of whatever device is using wobble plate drive system 10, as the wobble plate nutates.

Figure 13:
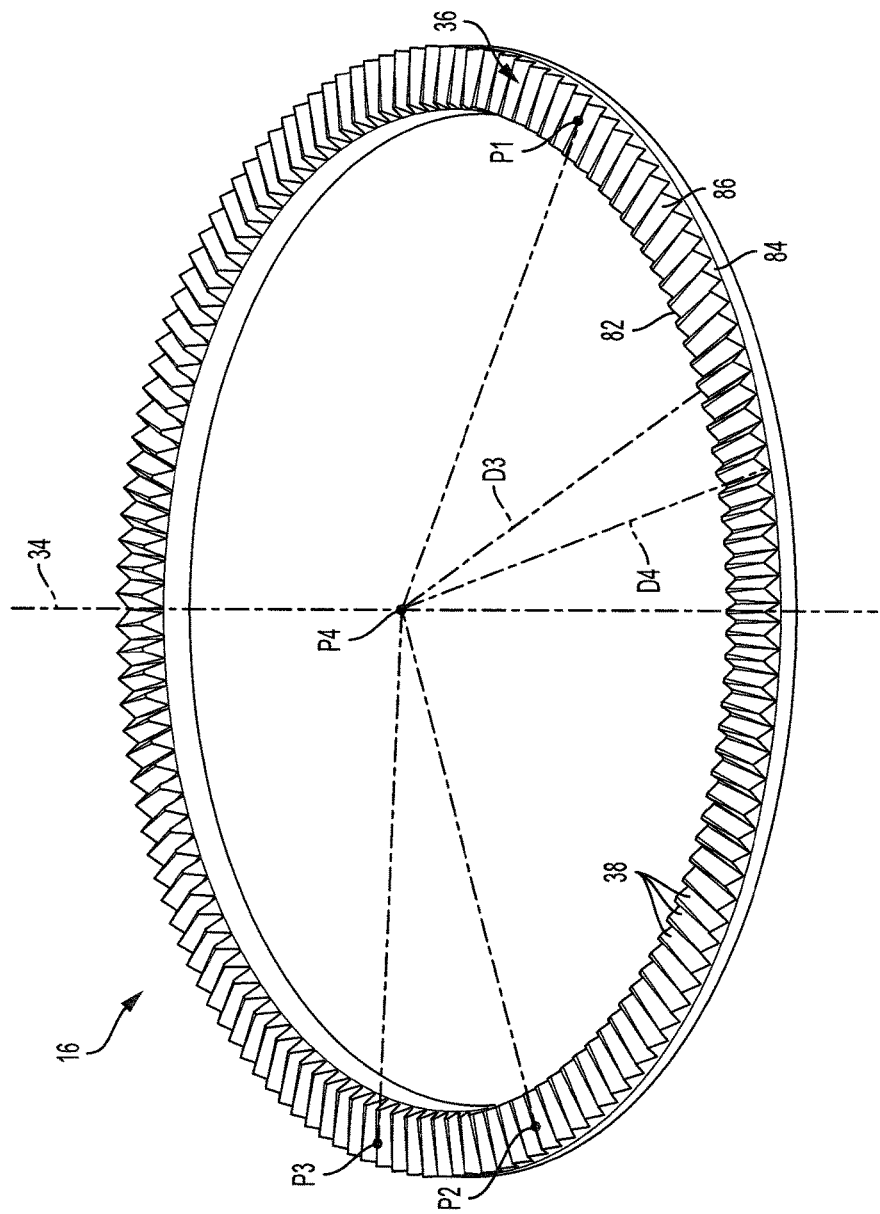
FIG. 13 is a diagrammatic representation of an isometric view of an output gear of the drive system of FIG. 1, showing a plurality of output teeth, the output gear being in an inverted position as compared to FIG. 1.

FIG. 13 is an isometric view of output gear 16. For clarity, output gear 16 in FIG. 11 appears "upside down," relative to its orientation in FIGS. 1 and 2. Output gear 16 may be free to rotate around the output axis 34 within the context of whatever device is using wobble plate drive system 10. Output gear 16 may be coupled to an output shaft or an output arm. Between the output axis 34 and the plurality of output teeth 38, output gear 16 may have any suitable structure.

Lower annular surface 36 may be a frustoconical or conical surface in the following sense: Consider three arbitrary points P1, P2, and P3 on the lower annular surface and spaced from one another in an angular direction around the output axis 34. There may be a conical line L1, L2, and L3 respectively through each of these points with each conical line lying in the lower annular surface. The three conical lines may be extendable through a fourth point P4 located on the output axis and spaced along the output axis from a plane defined by the three points P1, P2, and P3. Lower annular surface 36 may be convex.

Each of the plurality of output teeth may have a proximal end 82 disposed a distance D3 away from point P4 and a distal end 84 disposed a distance D4 away from point P4, with distance D4 being greater than D3.

A count of the plurality of output teeth may be any appropriate number. The count of output teeth may be more, less, or the same as the count of the plurality of face teeth. In the exemplary embodiment depicted in FIG. 13, there are 135 output teeth.

Figure 14:
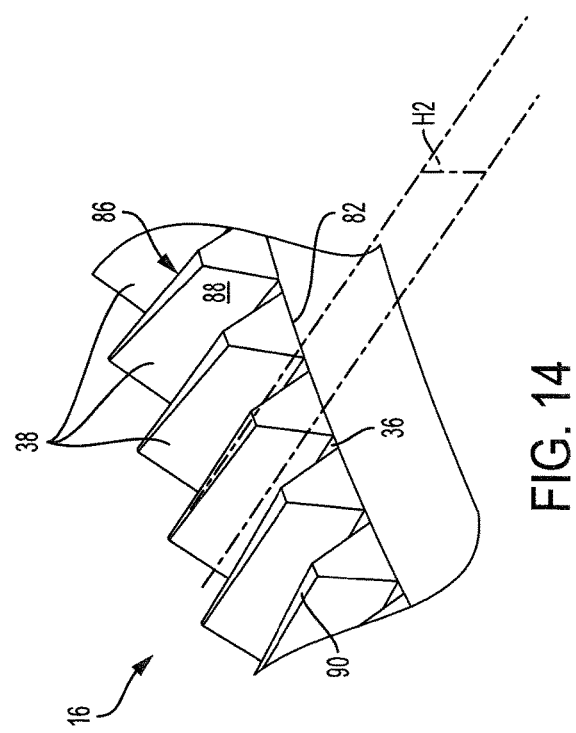
FIG. 14 is a diagrammatic representation of a detailed view of FIG. 13, showing several output teeth.

FIG. 14 is a detailed view of output gear 16, showing several output teeth 38 disposed on lower annular surface 36. Each output tooth may include a third driven face 86. The third driven face may be seen more clearly in FIG. 13. The third driven face 86 may extend from the proximal end 82 to the distal end 84 of an output tooth. Third driven face 86 may be planar, compose of more than one plane, or may be composed of one or more surfaces with curvature. The third driven face 86 may be configured to engage with the third driving face 68 of a wobble tooth 32 as the wobble plate 14 (see FIG. 8) nutates around the output gear 16 in the first nutation direction.

On the opposite side of an output tooth 38 from the third driven face 86 may be a fourth driven face 88. The fourth driven face 88 may extend from the proximal end 82 to the distal end 84 of an output tooth. Fourth driven face 88 may be planar, composed of more than one plane, or may be composed of one or more surfaces with curvature. The fourth driven face 88 may be configured to engage with the fourth driving face 70 of a wobble tooth 32 as the wobble plate 14 nutates around the output gear 16 in the second nutation direction (see FIG. 8).

Each output tooth 38 may have a lower surface 90 extending from the third driven face 86 to the fourth driven face 88. The lower surface 90 may define an output tooth height H2 as the distance between the lower annular surface 36 and the lower surface 90 of the output tooth, as measured along a direction parallel to the output axis. The output tooth height H2 may or may not be constant along an output tooth.

The output tooth height H2 may have a minimum value proximate the proximate end 82 of an output tooth.

Figure 15:
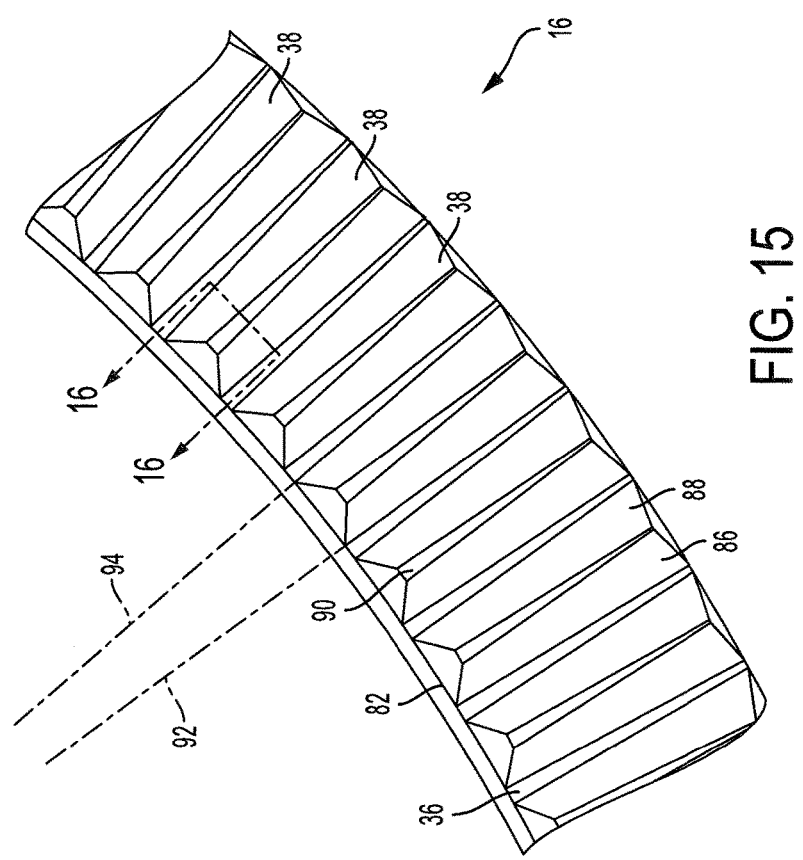
FIG. 15 is a diagrammatic representation of a bottom plan view of the wobble plate of FIG. 14, showing a subset of output teeth.

FIG. 15 is a bottom plan view of output plate 16, showing a subset of output teeth 38. Each output tooth may have a wedge-shaped footprint on the lower annular surface 36 in the same manner that a face tooth 32 may have a wedge-shaped footprint on the upper annular surface 28, see FIG. 11. That is, a line 92 made by the junction of the third driven face 86 with the lower annular surface 36 may extend through the output axis. Another line 94 made by the junction of the fourth driven face 88 with the lower annular surface 36 may extend through the output axis.

Figure 16:
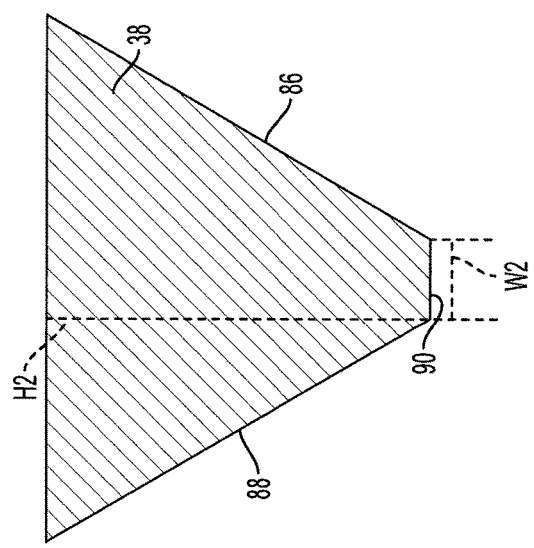
FIG. 16 is a diagrammatic representation of a cross-sectional view of a single output tooth, taken along plane 16-16 in FIG. 15.

FIG. 16 is a cross-sectional view, taken along plane 16-16 in FIG. 15, of an exemplary single output tooth 38. One or both of the third and fourth driven faces 86 and 88 may be substantially planar. The lower surface 90 of each output tooth may have a width W2. The width of the lower surface may vary along the output tooth, see for example in FIG. 15. The width W2 may have a maximum value proximate the proximal end 82 of a face tooth, see FIG. 15. The width W2 may vary along the output tooth as the height H2 varies.

Figure 17:
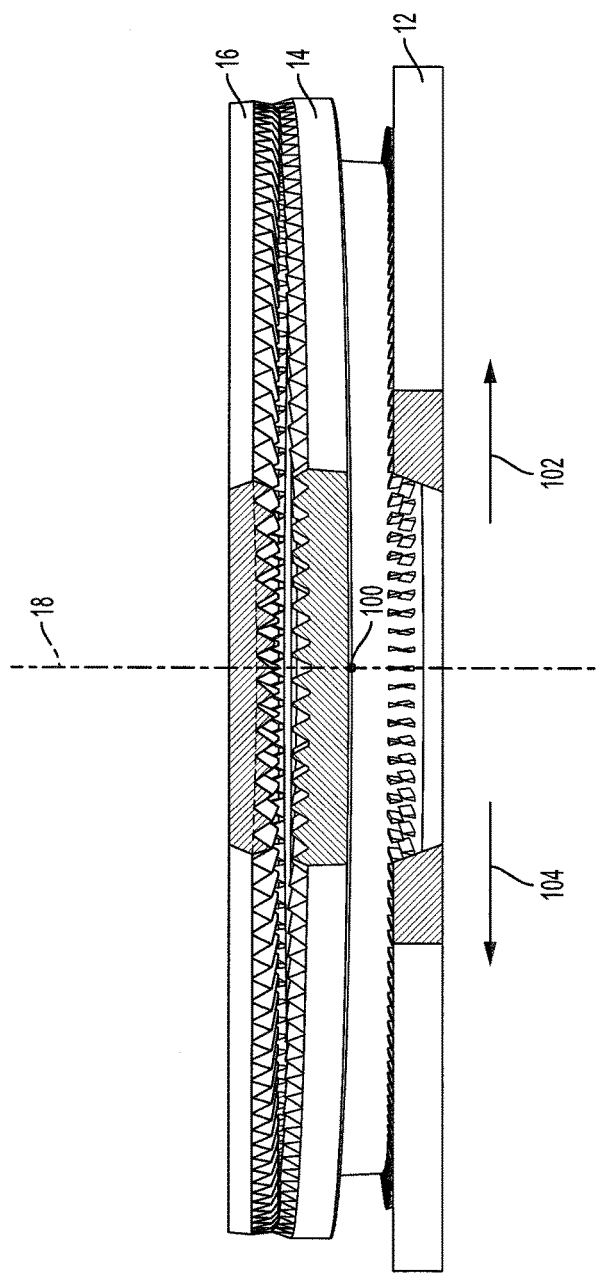
FIG. 17 is a diagrammatic representation of a side plane view of the drive system of FIG. 1, taken at A in FIG. 1, showing a down position of the wobble plate.

FIG. 17 is a side plane view of wobble plate drive system 10, taken at A in FIG. 1. Wobble plate 14 may have a down position, 0-degree position, or 0-degree point 100 which may be the position or point on the wobble plate which is farthest from the output plate, as measured in a direction parallel to the central axis 18. At the 0-degree point the wobble plate may be closest to the stator 12, as measured in a direction parallel to the central axis.

Wobble plate drive system 10 may be configured so that the wobble plate may nutate around the stator and the output gear in a first nutation direction, indicated by arrow 102. When wobble plate 14 nutates in the first nutation direction the down position 100 may move in direction 102, that is, to the right in FIG. 17. Wobble plate drive system 10 may be configured so that wobble plate 14 may nutate around the stator and the output gear in a second nutation direction indicated by arrow 104. When wobble plate 14 nutate in the second nutation direction, the down position 100 of wobble plate 14 may move in direction 104.

Figure 18:
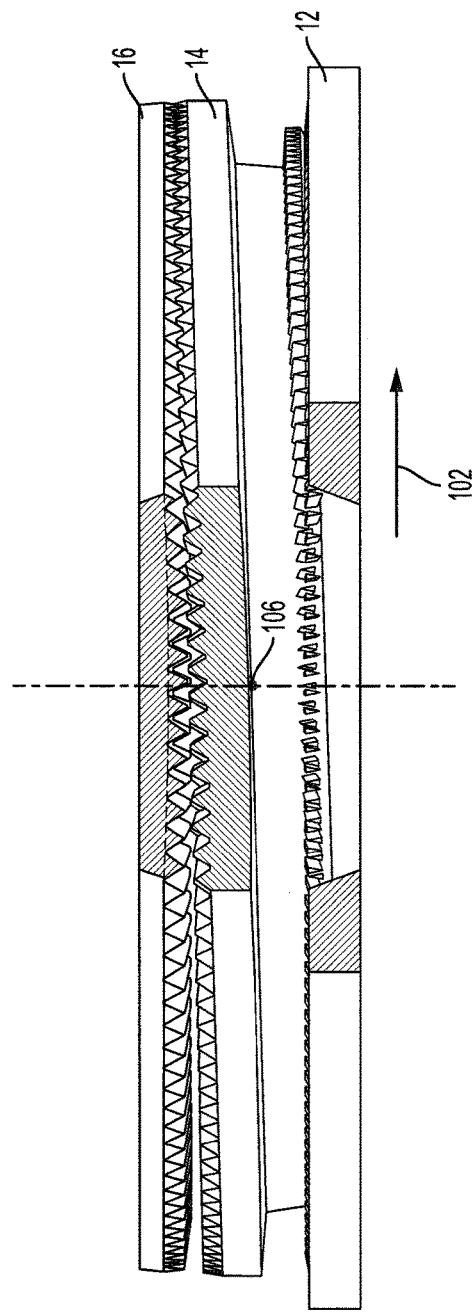
FIG. 18 is a diagrammatic representation of a side plane view of the drive system of FIG. 1, taken at B in FIG. 1, showing a 90-degree position which is one fourth of the way around the drive system from the down position.

FIG. 18 is a side plan view of wobble plate drive system 10, taken at B in FIG. 1. Wobble plate 14 may have a 90-degree position 106 that is 90 degrees away from the down position 100 in the first nutation direction 102. That is, the 90-degree position may be one fourth of the way around the wobble plate 14 from the 0-degree position 100 in the direction indicated by arrow 102.

As the wobble plate 14 nutates in the first nutation direction, the 90-degree position 106 may move in direction 102. In between down position 100 (see FIG. 17) and the 90-degree position 106 the plurality of wobble teeth may make substantially no contact with the plurality of stator teeth. In between the down position and the 90-degree position there may be substantially no contact between the plurality of face teeth and the plurality of output teeth.

Figure 19:
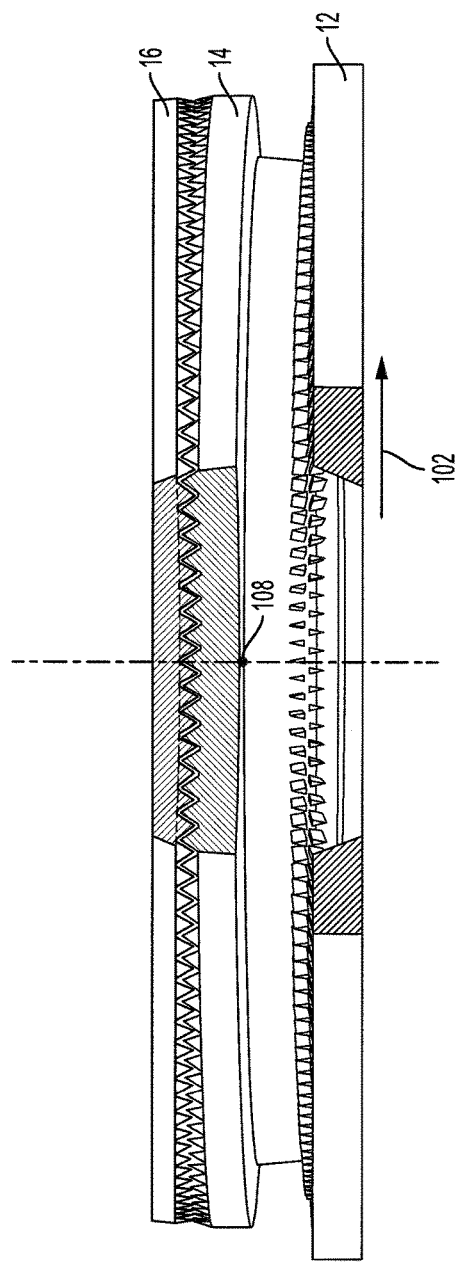
FIG. 19 is a diagrammatic representation of a side plane view of the drive system of FIG. 1, taken at C in FIG. 1, showing a 180-degree position which is one half of the way around the drive system from the down position.

FIG. 19 is a side plan view of wobble plate drive system 10, taken at C in FIG. 1. Wobble plate 14 may have a 180-degree position 108 that is 180 degrees away from the down position 100 in the first nutation direction 102. That is, the 180-degree position may be on the opposite side of wobble plate 14 from the down position.

As the wobble plate 14 nutates in the first nutation direction, the 180-degree position 108 may move in direction 102. In between the 90-degree position 106 (see FIG. 18) and the 180-degree position 108 there may be substantially no contact between the pluralities of wobble and stator teeth. In between the 90-degree position 106 (see FIG. 18)

and the 180-degree position 108 there may be substantially no contact between the pluralities of face and output teeth.

Figure 20:
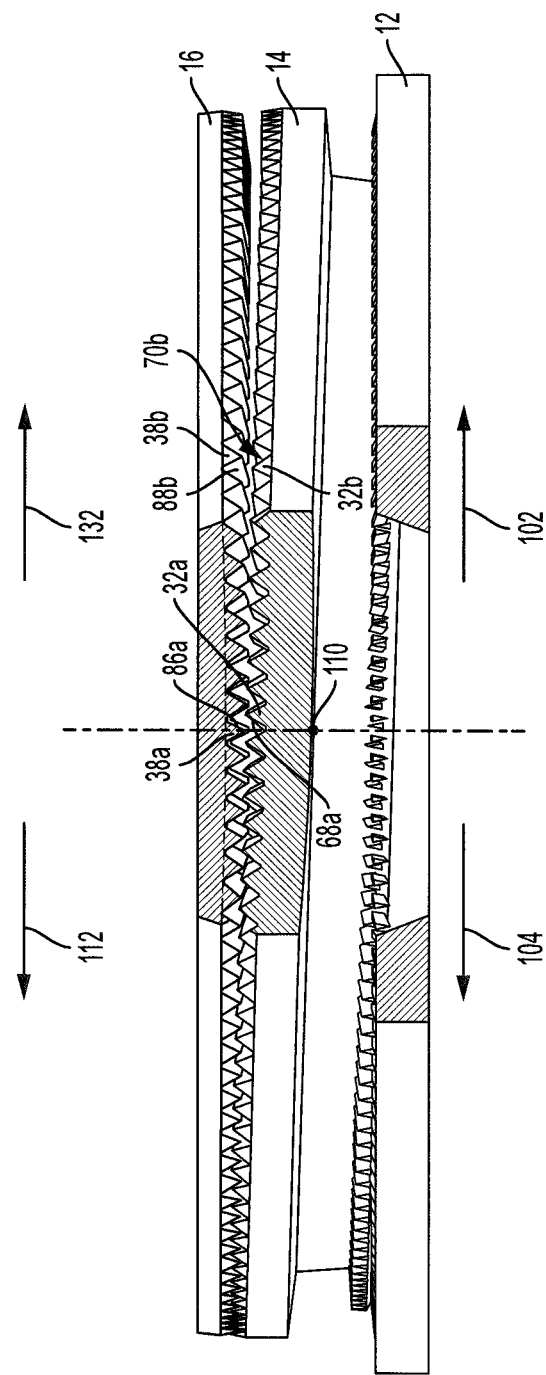
FIG. 20 is a diagrammatic representation of a side plane view of the drive system of FIG. 1, taken at D in FIG. 1, showing a 270-degree position which is three-fourths of the way around the drive system from the down position.

FIG. 20 is a side plan view of wobble plate drive system 10, taken at D in FIG. 1. Wobble plate 14 may have a 270-degree position or 270-degree point 110 that is 270 degrees away from the down position around a perimeter of the wobble plate in the first nutation direction 102. That is, the 270-degree position 110 may be three-fourths of the way around the wobble plate 14 from the 0-degree position 100 in the direction indicated by arrow 102.

As the wobble plate 14 nutates in the first nutation direction, the 270-degree position 110 may move in direction 102. In between the 180-degree position 108 (see FIG. 19) and the 270-degree position 110 there may be substantially no contact between the pluralities of wobble and stator teeth. In between the 180-degree position and the 270-degree position there may be engagement or contact between the plurality of face teeth and the plurality of output teeth.

In the example depicted in FIGS. 1-24 the count of wobble teeth is one less than the count of stator teeth. As described more fully below in reference to FIGS. 21-25, when wobble plate 14 nutates in the first nutation direction 102 it may also rotate more slowly in a first rotation direction 112. In this example the first rotation direction 112 is opposite the first nutation direction 102.

Further, in this example the count of face teeth is the same as the count of output teeth. As the wobble plate nutates around the output plate in the first nutation direction each face tooth of the plurality of face teeth may alternately engage and disengage with the plurality of output teeth. The nature of the face and output teeth may prevent any slipping of the wobble plate with respect to the output plate. Therefore, if a particular face tooth, say face tooth 32*a*, engages with a particular output tooth, say output tooth 38*a*, during a first nutation that same face tooth 32*a* may engage with that same output tooth 38*a* during a subsequent second nutation. This engagement may take the form of contact between the third driving face 68*a* of face tooth 32*a* and the third driven face 86*a* of output tooth 38*a*. As the wobble plate 14 may rotate in the first rotation direction 112 and the third driving face 68*a* may exert a contact force on the third driven face 86*a* the output plate 16 may subsequently also rotate in the first rotation direction 112. This interaction may take place between every interacting pair of face and output teeth, so that output plate 16 may rotate continuously as wobble plate 14 rotates.

As the wobble plate nutates in the first nutation direction 102 there may be substantially no contact between the pluralities of face and output teeth in between the 270-degree position and the 0-degree position, see FIG. 17. As the wobble plate nutates in the first nutation direction 102 the plurality of wobble teeth may engage with the plurality of stator teeth. This engagement of the wobble and stator teeth will be described more fully in reference to FIGS. 21-25.

Figure 21:
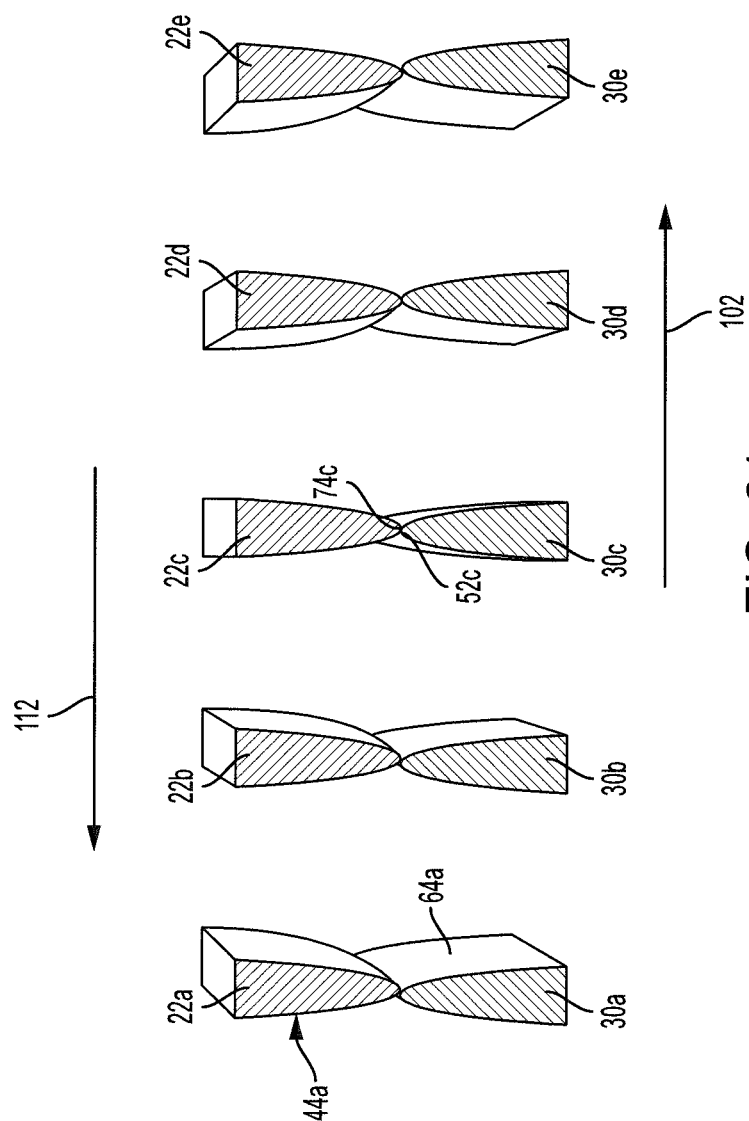
FIG. 21 is a diagrammatic representation of a zoomed in view of FIG. 17, showing contact between a subset of the wobble teeth and a subset of the stator teeth proximate the down position.

FIG. 21 is a zoomed in view of FIG. 17, showing a relative disposition of a subset of wobble teeth 30 and a subset of stator teeth 22 proximate the down position of the wobble plate. As described above, the plurality of wobble teeth may engage with the plurality of stator teeth between the 0-degree position, at the center of FIG. 21, and the 270-degree position, located to the left as viewed in FIG. 21 when the wobble plate is nutating in the first nutation direction 102. For example, referring to specific wobble and stator teeth, wobble teeth 30*a* and 30*b* may be engaging with stator teeth 22*a* and 22*b* respectively, wobble tooth 30*c* may be just commencing engagement with stator tooth 22*c*, and wobble teeth 30*d* and 30*e* may not yet be engaging with stator teeth 22*d* and 22*e* respectively.

A first point of contact or engagement between a wobble tooth and a stator tooth may occur proximate the apexes of each tooth. For example, the first point of contact between wobble tooth 30*c* and stator tooth 22*c* may be between the apex 74*c* of wobble tooth 30*c* and the apex 52*c* of stator tooth 22*c*. Alternately, the respective apexes of the wobble and stator teeth may not be directly aligned when the teeth first make contact but may be spaced relative to one another in either direction 102 or direction 112.

As the wobble plate nutates in the first nutation direction 102, the contact between an exemplary wobble tooth 30*a* and an exemplary stator tooth 22*a* may occur substantially between the first driving face 44*a* of the stator tooth 22*a* and the first driven face 64*a* of wobble tooth 30*a*. This contact may occur when the wobble tooth 30*a* is in between the 0-degree position and the 270-degree position.

Figure 22:
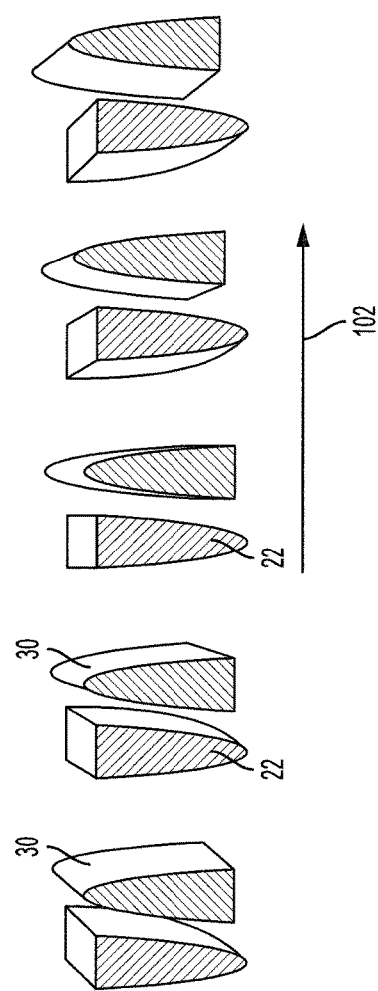
FIG. 22 is a diagrammatic representation of a zoomed in view of FIG. 18, showing a subset of the wobble teeth and a subset of the stator teeth proximate the 90-degree position.

FIG. 22 is a zoomed in view of FIG. 18, showing a relative disposition of a subset of wobble teeth 30 and a subset of stator teeth 22 proximate the 90-degree position of the wobble plate, the wobble plate nutating in the first nutation direction 102. As described above, the plurality of wobble teeth may make substantially no contact with the plurality of stator teeth between the 0-degree position and the 90-degree position.

Figure 23:
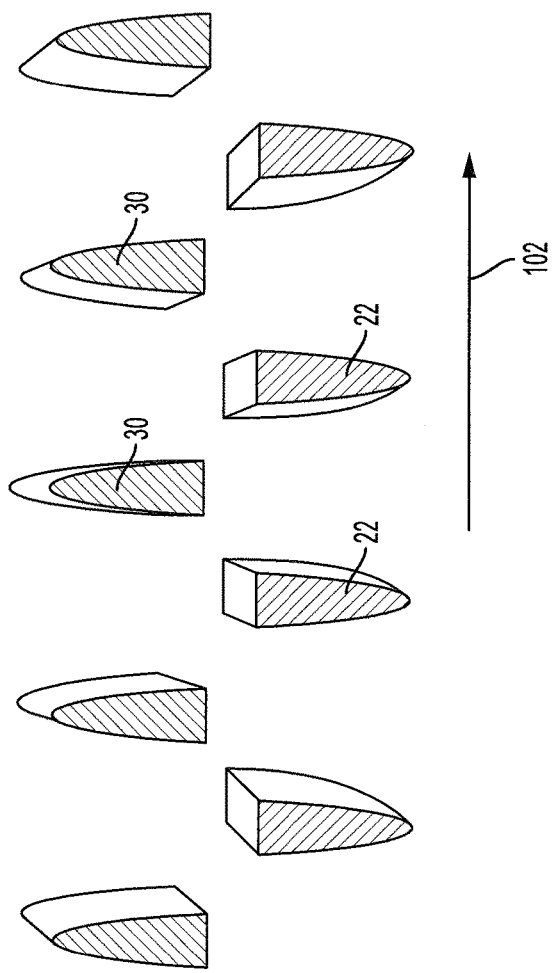
FIG. 23 is a diagrammatic representation of a zoomed in view of FIG. 18, showing a subset of the wobble teeth and a subset of the stator teeth proximate the 180-degree position.

FIG. 23 is a zoomed in view of FIG. 19, showing a relative disposition of a subset of wobble teeth 30 and a subset of stator teeth 22 proximate the 180-degree position of the wobble plate. As described above, the plurality of wobble teeth may make substantially no contact with the plurality of stator teeth between the 90-degree position and the 180-degree position as the wobble plate nutates in the first nutation direction 102.

Figure 24:
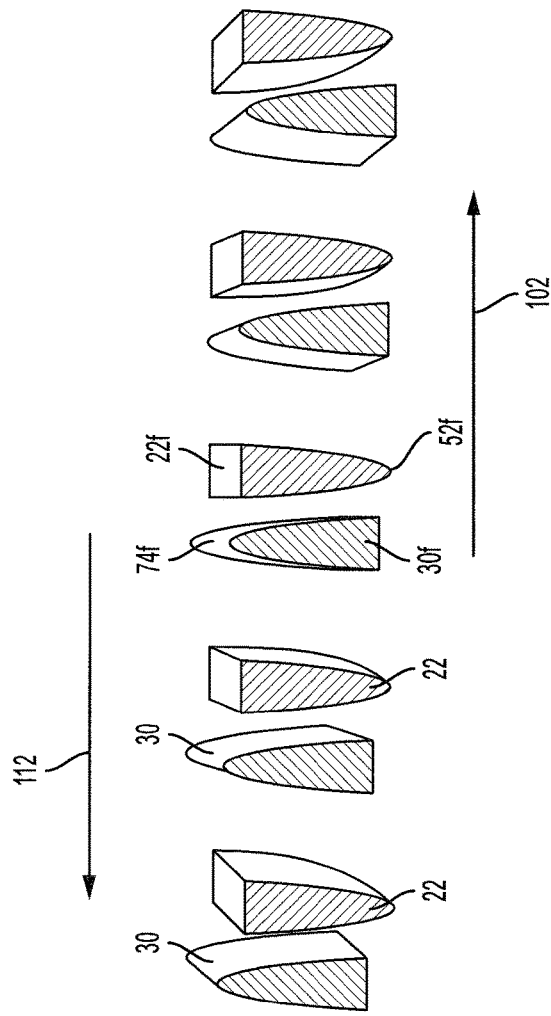
FIG. 24 is a diagrammatic representation of a zoomed in view of FIG. 20, showing a subset of the wobble teeth and a subset of the stator teeth proximate the 270-degree position.

FIG. 24 is a zoomed in view of FIG. 20, showing a relative disposition of a subset of wobble teeth 30 and a subset of stator teeth 22 proximate the 270-degree position of the wobble plate. As described above, the plurality of wobble teeth may make substantially no contact with the plurality of stator teeth between the 180-degree position and the 270-degree position as the wobble plate nutates in the first nutation direction 102.

The plurality of wobble teeth may engage with the plurality of stator teeth between the 0-degree position and the 270-degree position when the wobble plate is nutating in the first nutation direction 102, that is, within the quartile of the stator between the down position and the 270-degree position. However, a wobble tooth need not engage with a stator tooth at every location between the 0-degree position and the 270-degree position. The engagement may first begin when a wobble tooth is proximate the 0-degree position and may end when that wobble tooth is at any location between the 0-degree position and the 270-degree position. For example, wobble tooth 30*f* may have commenced engaging with a corresponding stator tooth 22*f* when wobble tooth 30*f* was proximate the down position. This contact may begin with the apex 74*f* of wobble tooth 30*f* making contact with the stator tooth 22*f* proximate the apex 52*f* of the stator tooth. As depicted in FIG. 24, the engagement between wobble tooth 30*f* and stator tooth 22*f* ended before wobble tooth 30*f* was proximate the 270-degree position.

Figure 25:
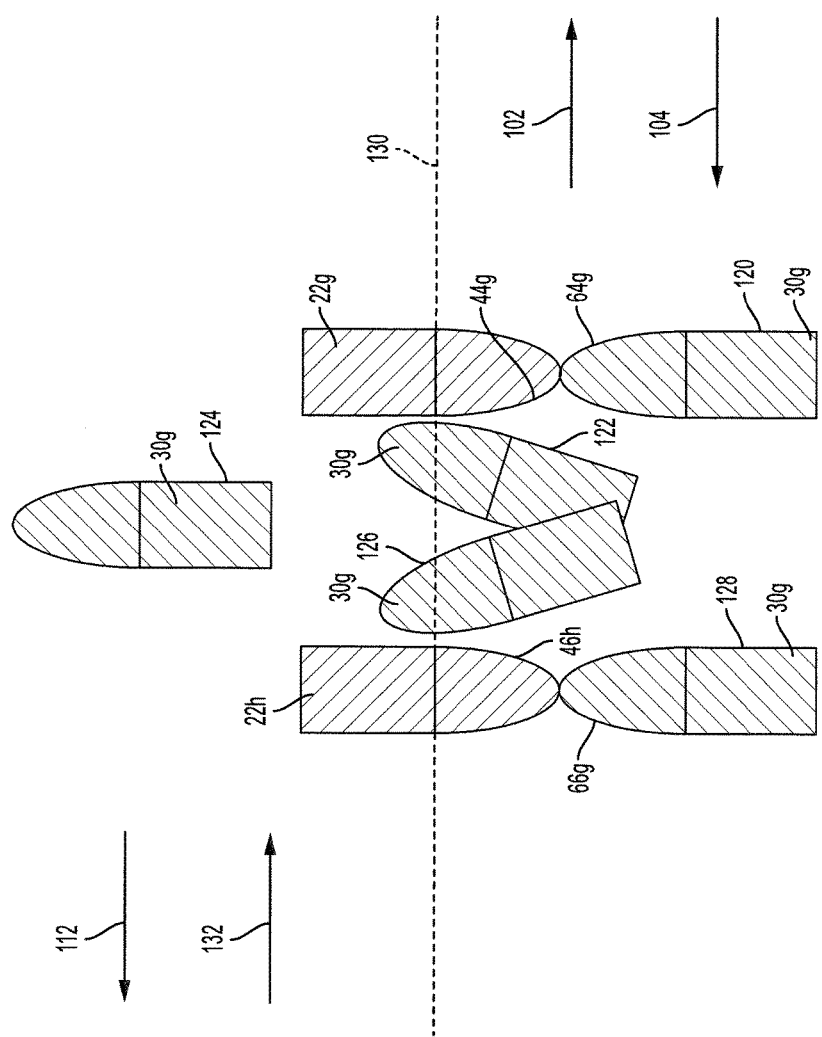
FIG. 25 is a diagrammatic representation of a single wobble tooth and a pair of stator teeth, showing the single wobble tooth at five positions over the course of one full nutation of the wobble plate.

FIG. 25 is a schematic of a single wobble tooth 30*g* and a pair of adjacent stator teeth, 22*g* and 22*h*, showing the wobble tooth 30*g* at five successive positions, 120, 122, 124, 126, and 128, over the course of one full nutation of the wobble plate in the first nutation direction 102. As the wobble plate nutates in the first nutation direction 102, the wobble plate may rotate in the first rotation direction 112. That is, as the down position of the wobble plate moves to the right as seen in FIG. 25, the wobble plate and its plurality of wobble teeth may move to the left as seen in FIG. 25.

Wobble tooth 30g may take a first position 120 at a first time when tooth 30g is proximate the down position of the wobble plate, see FIGS. 17 and 21. Wobble tooth 30g may take a second position 122 at a second time when tooth 30g is proximate the 270-degree position of the wobble plate, see FIGS. 20 and 24. Wobble tooth 30g may take a third position 124 at a third time when tooth 30g is proximate the 180-degree position of the wobble plate, see FIGS. 19 and 23. Wobble tooth 30g may take a fourth position 126 at a fourth time when tooth 30g is proximate the 90-degree position of the wobble plate, see FIGS. 18 and 22. Wobble tooth 30g may take a fifth position 128 at a fifth time when tooth 30g is proximate the 0-degree position of the wobble plate, see FIGS. 17 and 21. Between the first time and the fifth time the wobble plate may complete one full nutation. Note that the angle of wobble tooth 30g when in positions 122 and 126 may be exaggerated for the purpose of distinguishing between the five positions.

Stator 12 and its plurality of stator teeth 22 may define a plane, seen in cross section at 130 in FIG. 25. Plane 130 may be perpendicular to central axis 18 and may intersect each of the plurality of stator teeth 22 at a common location, see FIG. 3. That is, plane 130 may intersect each stator tooth at any point between the apex 52 and the connecting surface 54 of a stator tooth, see FIG. 6. For clarity, plane 130 has been depicted as roughly bisecting each stator tooth 22 in FIG. 25.

First position 120 and fifth position 128 may be located below the plurality of stator teeth and plane 130. Third position 124 may be located above the plurality of stator teeth and plane 130. During a single nutation of the wobble plate, wobble tooth 30g may move from the first position 120 below the plurality of stator teeth, through plane 130 defined by the plurality of stator teeth, to the third position 124 above the plurality of stator teeth, back through plane 130 defined by the plurality of stator teeth, and to the fifth position below the plurality of stator teeth. Herein above and below may be relative to plane 130 and along the central axis 18, see FIG. 3.

As the wobble tooth 30g moves between the first position 120 and the second position 122, the first driving face 44g of stator tooth 22g may engage with the first driven face 64g of wobble tooth 30g. This engagement may be in the form of a rolling contact, where the first driven face rolls along the first driving face. This rolling contact may be in contrast to many standard gear interfaces where opposing faces of gear teeth interact via a sliding contact. In general, assuming the same two surfaces are involved, rolling contact has much less friction than sliding contact between the two surfaces. As the wobble plate may only make contact with the stator between the 0-degree position and the 270-degree position when nutating in the first nutation direction, and this contact may be limited to rolling contact between subsets of the pluralities of wobble and stator teeth, the wobble plate may nutate around the stator with very little friction. Such a configuration may lead to an efficient transfer of nutational motion to rotational motion.

As each of the wobble teeth and stator teeth may be wedge shaped, contact forces between stator tooth 22g and wobble tooth 30g may be exerted at a point of contact between the teeth and the contact forces may be substantially perpendicular to a line parallel to the central axis and a radial line extending from the point of contact to the central axis. The engagement of stator tooth 22g and wobble tooth 30g may occur along a line of contact, perpendicular to the schematic view of FIG. 25, the line of contact extending through a center of mass of the wobble plate.

A gear ratio for wobble plate drive system 10 can be calculated by knowing the counts of the pluralities of stator, wobble, face, and output teeth. In the example shown in FIGS. 1-25, there are 181 stator teeth, 180 wobble teeth, 135 face teeth, and 135 output teeth. During each nutation each wobble tooth may engage with a particular stator tooth, disengage from the plurality of stator teeth, and then engage with a stator tooth adjacent to the original stator tooth. Thus, it may take 181 nutations of the wobble plate for any wobble tooth to return to its original position. In other words, 181 nutations of the wobble plate may correspond to one single rotation of the wobble plate. As the output plate has the same number of teeth as the face teeth of the wobble plate, the output plate may rotate at the same rate as the wobble plate. Wobble plate drive system 10 may have a gear ratio equal to the number of stator teeth, which may fall in a range of tens of stator teeth to hundreds of stator teeth. This is a remarkably large gear ratio for a system with only two moving parts.

As will be understood by a person skilled in the art, many possibilities exist for the numbers of stator, wobble, face, and output teeth as well as the differences between those numbers of teeth. The appropriate choices for the numbers of the respective pluralities of teeth can be made depending on the desired application for wobble plate drive system 10 and/or the materials to be used for the system.

The above discussion relating to FIGS. 17-25 has largely centered on the wobble plate nutating in the first nutation direction 102, see FIG. 17. Wobble plate 14 may also nutate in the second nutation direction 104. When nutating in the second nutation direction, the down position 100 may move to the left as viewed in FIG. 17.

As wobble plate 14 nutates in the second nutation direction 104, each face tooth of the plurality of face teeth may alternately engage and disengage with the plurality of output teeth. For example, a particular face tooth 32b may engage with a particular output tooth 38b during a first nutation, see FIG. 20. During a second subsequent nutation, face tooth 32b may engage with that same output tooth 38b in the case where the numbers of face teeth and output teeth are the same. This engagement may take the form of contact between the fourth driving face 70b of face tooth 32b and the fourth driven face 88b of output tooth 38b. A the wobble plate may rotate in a second rotation direction 132 and the fourth driving face 70b may exert a contact force on the fourth driven face 88b, the output plate 16 may subsequently also rotate in the second rotation direction 132.

When wobble plate 14 is nutating in the second nutation direction 104, each tooth in the plurality of wobble teeth may rotate in the second rotation direction 132. Regarding FIG. 25, a single wobble tooth 30g may successively take positions 128, 126, 124, 122, and 120 in the opposite order than when wobble plate 14 nutates in the first direction. That is, wobble tooth 30g may first make contact with a stator tooth at the fifth position 128. Wobble tooth 30g may then make rolling contact with stator tooth 22h along the second driven face 66g of wobble tooth 30g and the second driving face 46h of stator tooth 22h between the fifth position 128 and the fourth position 126. Wobble tooth 30g may then make substantially no contact with the plurality of stator teeth as it moves from the fourth position 126 to the third position 124, the second position 122 and the first position 120. Once reaching first position 120, the wobble tooth 30g may then make contact with tooth 22g as a subsequent nutation begins.

Figure 26:
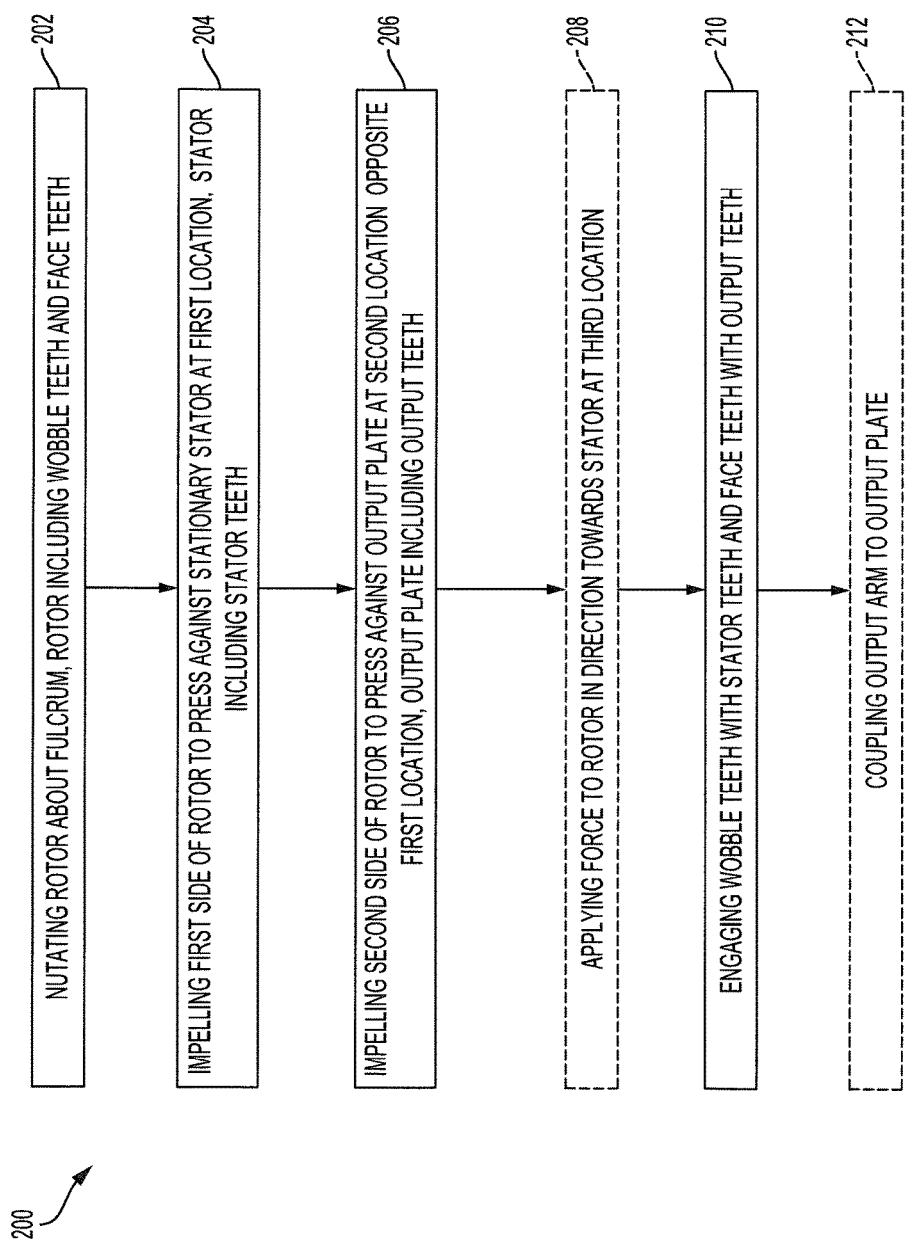
FIG. 26 is a diagrammatic representation of a flow chart illustrating a method for operating a wobble plate drive mechanism.

FIG. 26 depicts multiple steps of a method, generally indicated at 200, for operating a wobble plate drive mechanism according to aspects of the present disclosure. The wobble plate drive mechanism may be any of the embodiments depicted and discussed in reference to FIGS. 1-25. Although various steps of method 200 are described below and depicted in FIG. 26, the steps need not necessarily all be performed, in some cases may be performed din a different order than the order shown, and in some cases may be performed concurrently.

Method 200 may include a step 202 of nutating a rotor about a fulcrum, the rotor including a plurality of wobble teeth and a plurality of face teeth. As discussed in reference to FIG. 7, the wobble plate or rotor 14 may be supported by a fulcrum. The rotor 14 may have a wobble axis 24 that may precess or nutate around a stationary central axis 18. The nutating wobble axis 24 and stationary central axis 18 may be seen and discussed in reference to FIG. 2. The plurality of wobble teeth may be disposed on an outer cylindrical surface and the plurality of face teeth may be disposed on an upper annular surface. The upper annular surface may be a conical surface.

The rotor may have a plurality of wobble teeth and a plurality of face teeth, see for example, the plurality of wobble teeth 30 and the plurality of face teeth 32 discussed in FIGS. 2-25. Each tooth of the plurality of wobble teeth may have a face defined by a compound involute of a circle and an ellipse, as discussed in relation to FIG. 6. Each tooth of the plurality of face teeth may have a wedge-shaped footprint on the upper annular surface.

Method 200 may include a step 204 of impelling a first side of the rotor to press against a stationary stator at a first location, the stator including a plurality of stator teeth. For example, the first location may be the down position 100 depicted in FIG. 17. Proximate the down position a wobble tooth of the plurality of wobble teeth may make contact with a stator tooth of the plurality of stator teeth, as described in reference to FIG. 21.

The stator may include a plurality of stator teeth, see for example the plurality of stator teeth 22 depicted in FIG. 2. As discussed in relation to FIG. 6, each tooth of the plurality of stator teeth may have a face defined by a compound involute or a circle and an ellipse.

A pair of adjacent stator teeth may define a tooth pitch as an angular separation between corresponding locations on each tooth of the pair of adjacent stator teeth. For example, referring to FIG. 5, the tooth pitch may be the sum of the angular width of a single stator tooth A2 and the angular separation A3 between any two adjacent stator teeth, as measured in an angular direction around the central axis 18, see FIG. 3. Each stator tooth may have a cross-sectional shape, taken at a location distal from the inner cylindrical surface, see for example, FIG. 6. The cross-sectional shape of a stator tooth may have an angular width that is less than one half of the tooth pitch. The angular width of the cross-sectional shape of the stator tooth may be angular width A2 seen in FIG. 5.

The stator may include a set of electromagnets. Each of the set of electromagnets may be capable of creating a variable magnetic field. The strength and direction of the magnetic fields may both be variable. Each of the set of electromagnets may be independently controllable. Each of the set of electromagnets may create a magnetic field when a current passes through the electromagnet. The current may be an alternating current or a direct current.

The rotor may include a magnetic material capable of responding to the magnetic fields created by the set of electromagnets in the stationary stator. The first side of the rotor may be impelled to press against the stator by magnetic forces applied to the rotor, the magnetic forces being a response of the rotor to the magnetic fields created by the electromagnets of the stator.

Method 200 may include a step 206 of impelling a second side of the rotor to press against an output plate at a second location opposite the first location, the output plate including a plurality of output teeth. The second side of the rotor may be the upper annular surface 28 seen in FIG. 2. The second location may be the 180-degree position 108 depicted in FIG. 19, which may be on the opposite side of the rotor as the down position.

The output plate may be output gear 16 and the plurality of output teeth may be the plurality of output teeth 38 shown in FIG. 2. Each of the plurality of output teeth may have a wedge-shaped footprint on a lower annular surface of the output plate.

The second side of the rotor may be impelled to press against the output plate by magnetic forces applied to the rotor. The second location on the rotor may be impelled against the output plate directly or indirectly by magnetic forces. For a direct example, a force may be applied to the rotor at the second location, the forces directed toward the output plate. In an indirect example, the rotor may be supported by a fulcrum proximate the wobble axis. If a magnetic forces is applied to the rotor at the first location in a direction away from the output plate, then the second location on the opposite side of the rotor may be leveraged toward the output plate, much like a seesaw. Thus, the second location on the rotor may be impelled toward the output plate by the combined effects of forces applied to the rotor at the first location and the support of the fulcrum.

The stator of step 204 may define a stator plane, for example, plane 130 described in reference to FIG. 25. The output plate of step 206 may be configured to be parallel to the stator plane. For example, the output plate and the stator may have substantially coincident symmetry axes 34 and 18, respectively, shown in FIG. 2. The rotor of step 202 may be configured to be inclined at an angle with respect to the stator plane and the output plate and disposed between the stator and the output plate, see for example, FIG. 2.

Method 200 may include a step 210 of engaging the wobble teeth with the stator teeth and the face teeth with the output teeth as the rotor nutates about the fulcrum. Step 210 may be performed concurrently with step 202, that is, the engagement of the pluralities of teeth may occur as the rotor nutates about the fulcrum. As the rotor nutates, any individual wobble tooth may be periods of engagement with a first stator tooth, periods where the lower rotor tooth is not engaged with any teeth, and periods of engagement with a second stator tooth adjacent to the first stator tooth, see the discussion relating to FIGS. 24-25. The engagement may be a rolling contact between faces that may be defined by a compound involute of a circle and an ellipse.

As the rotor nutates, any individual face tooth may have periods of engagement with a first output tooth, periods where the face tooth is not engaged with any teeth, and periods of engagement again with that same first output tooth.

The counts of the number of teeth in the pluralities of stator teeth, wobble teeth, face teeth, and output teeth may be configured to provide a number of nutations for every single rotation of the output plate. For example, in the example shown in FIGS. 1-25, there are 181 stator teeth, 180 wobble teeth, 135 face teeth, and 135 output teeth. As discussed in relation to FIG. 25 this configuration leads to a gear ratio where the rotor will nutate approximately 181 times for every one time the output plate rotates. However, other choices for the counts of the pluralities of teeth can be made depending on the desired gear ratio and other design constraints.

Method 200 may optionally include a step 208 of applying a force to the rotor in a direction toward the stator at a third location. The third location may be the 90-degree position 106 shown in FIG. 18. That is, the third location may be 90 degrees removed from the first location around the rotor in a first direction of nutation, see 102 in FIG. 17. Alternately, the third location may be the 270-degree position 110 shown in FIG. 20. That is, the third location may be 90 degrees removed from the first location around the rotor in a second direction of nutation, see 104 in FIG. 17.

If the rotor makes contact with the stator at the first location and a force is applied at the third location 90 degrees around the rotor from the first location, this force may cause the rotor to nutate in a direction toward the third location. That is, if an attractive force is applied to the 90-degree position 106 shown in FIG. 18 and the rotor 14 at that position moves toward the stator 12 in response to that force, then one quarter of a nutation later that same location on the rotor 14 will now be at the down position 100, see FIG. 17, as the wobble plate nutates in the first nutation direction. Applying the force at the 270-degree position 110 may cause the wobble plate to nutate in the second nutation direction.

Applying a force to the rotor that is always 90 degrees ahead of the down position, in either direction of nutation, may drive the nutation of the rotor about the fulcrum. As described in reference to step 204, magnetic forces may be applied to the rotor by the magnetic fields created by a set of electromagnets of the stator. As the strength and direction of the magnetic fields created by the set of electromagnets may be controlled, the forces applied to the rotor may change their strength, direction, and their location on the rotor. Electromagnetic forces may be used to impel the engagement of the rotor teeth with the stator teeth and the output plate, as well as drive the nutation of the rotor itself.

Method 200 may optionally include a step 212 of coupling an output arm to the output plate. There are numerous ways to couple a rotating plate or gear to an arm or shaft so that the angular rotation of the plate corresponds to a linear movement of the arm. As the wobble plate drive mechanism used in method 200 may be configured so that a large number of nutation of the rotor results in only one rotation of the output plate, such a mechanism may be used to create an actuator capable of very fine control of an output plate or an output arm.

The wobble plate drive mechanism of method 200 may be configured so that during a single nutation of the wobble plate at least one of the plurality of wobble teeth is configured to move from a first position below the plurality of stator teeth, through a plane defined by the plurality of stator teeth to a second position above the plurality of stator teeth, back through the plane defined by the plurality of stator teeth, and to a third position below the plurality of stator teeth, see for example the discussion relating to FIG. 25.

The steps of method 200 need not be complete in the order listed above or shown in FIG. 26. Indeed, some or all of the steps of method 200 may be performed at the same time. Some or all of the steps of method 200 may be performed for some or all of the duration of use of the wobble plate drive mechanism.

Method 200 largely describes using the wobble plate drive mechanism as an electrical motor, where electrical energy is converted into the mechanical energy of the nutating and rotating wobble plate and the rotating output plate. Such a wobble plate drive mechanism has other methods of use. For example, the above described transformation of energy could be done in reverse, where mechanical energy of a translating output shaft or a rotating output plate is converted into the mechanical energy of the nutating and rotating wobble plate. This energy could then be converted into electrical energy in the electromagnetic coils of the stator. Thus, the wobble plate drive mechanism may be used as an electrical generator or a mechanical governor configured to limit the rotational energy of the output plate.

Advantages, Features, Benefits

The different embodiments of the wobble plate drive system described herein provide several advantages over known solutions for designing motors with high gear ratios that also take up a small volume. According the present disclosure gear ratios in the hundreds are possible using only a stator, a wobble plate, and an output plate where such mechanisms could be contained within a small volume. For example, the illustrative embodiments described herein allow for high-efficiency non-eccentric motion of a nutating wobble plate. No known system or device can perform these functions, particularly in such a small volume. Thus, the illustrative embodiments described herein are particularly useful for creating actuators with very fine motor control. However, not all embodiments described herein provide the same advantages or the same degree of advantage.

CONCLUSION

The disclosure set forth above may encompass multiple distinct disclosures with independent utility. Although each of these disclosures has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only, and do not constitute a characterization of any claimed disclosure. The subject matter of the disclosure(s) includes all novel and nonobvious combinations and subcombinations of the various elements, features, functions, and/or properties disclosed herein. The following claims particularly point out certain combinations and subcombinations regarded as novel and nonobvious. Disclosure(s) embodied in other combinations and subcombinations of features, functions, elements, and/or properties may be claimed in applications claiming priority from this or a related application. Such claims, whether directed to a different disclosure or to the same disclosure, and whether broader, narrower, equal, or different in scope to the original claims, also are regarded as included within the subject matter of the disclosure(s) of the present disclosure.

We claim:
1. A wobble plate drive system, comprising:
   a stator having a central axis and a plurality of stator teeth disposed on an inner cylindrical surface;
   a wobble plate having a wobble axis disposed at a non-zero angle relative to the central axis, an outer cylindrical surface, an upper annular surface, a plurality of wobble teeth disposed on the outer cylindrical surface, and a plurality of face teeth disposed on the upper annular surface; and an output gear having an output axis substantially aligned with the central axis, a lower annular surface, and a plurality of output teeth disposed on the lower annular surface;

wherein the wobble plate is configured to rotate, the plurality of wobble teeth are configured to engage with the plurality of stator teeth, and the plurality of face teeth are configured to engage with the plurality of output teeth as the wobble plate nutates around the stator.

2. The wobble plate drive system of claim 1, wherein each tooth of the plurality of wobble teeth is configured to engage a tooth of the plurality of stator teeth via rolling contact as the wobble plate nutates around the stator.

3. The wobble plate drive system of claim 1, wherein the wobble plate has a 0-degree position which is farthest from the output gear in a direction along the central axis, and a 270-degree position which is 270 degrees around a perimeter of the wobble plate from the 0-degree position in a direction of nutation, and one of the plurality of wobble teeth engages with a corresponding one of the plurality of stator teeth disposed in a quartile of the stator between the 270-degree position and the 0-degree position.

4. The wobble plate drive system of claim 1, wherein each tooth of the plurality of stator teeth has a stator tooth cross-sectional shape distal from the inner cylindrical surface and each tooth of the plurality of wobble teeth has a wobble tooth cross-sectional shape distal from the outer cylindrical surface, and each stator tooth cross-sectional shape and each wobble tooth cross-sectional shape is at least partially defined by a compound involute of a circle and an ellipse.

5. The wobble plate drive system of claim 1, wherein a contact force between one of the plurality of stator teeth and one of the plurality of wobble teeth is exerted at a point of contact between these teeth, the contact force being substantially perpendicular to a line parallel to the central axis and a radial line extending from the point of contact to the central axis.

6. The wobble plate drive system of claim 1, wherein one of the plurality of stator teeth and one of the plurality of wobble teeth engage along a line of contact, and the line of contact extends through a center of mass of the wobble plate.

7. The wobble plate drive system of claim 1, wherein each of the plurality of wobble teeth has an angular width, as measured in an angular direction around the wobble axis, that is less than one half of an angular spacing between adjacent stator teeth of the plurality of stator teeth, as measured in an angular direction around the central axis.

8. The wobble plate drive system of claim 1, wherein during a single nutation of the wobble plate, at least one of the plurality of wobble teeth is configured to move from a first position below the plurality of stator teeth, through a plane defined by the plurality of stator teeth, to a second position above the plurality of stator teeth, back through the plane defined by the plurality of stator teeth, and to a third position below the plurality of stator teeth, where below and above are defined relative to the plane defined by the plurality of stator teeth.

9. A method for operating a wobble plate drive mechanism, comprising:

nutating a rotor about a fulcrum, the rotor including a plurality of wobble teeth disposed on an outer cylindrical surface and a plurality of face teeth disposed on an upper annular surface, impelling a first side of the rotor to press against a stator at a first location, the stator including a plurality of stator teeth, impelling a second side of the rotor to press against an output plate at a second location, the second location being on an opposite side of the rotor relative to the first location, the output plate including a plurality of output teeth, and engaging the wobble teeth with the stator teeth and the face teeth with the output teeth as the rotor nutates about the fulcrum.

10. The method of claim 9, wherein each tooth of the plurality of wobble teeth and the plurality of stator teeth has a face defined by a compound involute of a circle and an ellipse.

11. The method of claim 9, wherein
a pair of adjacent stator teeth define a tooth pitch as an angular separation between corresponding locations on each tooth of the pair of adjacent stator teeth; and
each stator tooth has a cross-sectional shape distal from an inner cylindrical surface, the cross-sectional shape having an angular width that is less than one half of the tooth pitch.

12. The method of claim 9, wherein the stator defines a stator plane, the output plate is configured to be parallel to the stator plane, and the rotor is configured to be inclined at an angle with respect to the stator plane and the output plate and disposed between the stator and the output plate.

13. The method of claim 9, further comprising applying a force to the rotor in a direction toward the stator at a third location that is 90-degrees removed from the first location around the rotor in a direction of nutation.

14. The method of claim 9, wherein during a single nutation of the rotor, at least one of the plurality of wobble teeth is configured to move from a first position below the plurality of stator teeth, through a plane defined by the plurality of stator teeth, to a second position above the plurality of stator teeth, back through the plane defined by the plurality of stator teeth, and to a third position below the plurality of stator teeth, where below and above are defined relative to the plane defined by the plurality of stator teeth.

15. The wobble plate drive system of claim 1, wherein at least one of the plurality of wobble teeth has a cross-sectional shape distal from the outer cylindrical surface at least partially defined by a compound involute of a circle and an ellipse.

16. The wobble plate drive system of claim 15, wherein each tooth of the plurality of wobble teeth has at least one engaging surface oriented such that a line extending along the engaging surface also extends through a center of mass of the wobble plate.

17. The wobble plate drive system of claim 15, wherein each tooth of the plurality of wobble teeth has an angular width that is less than one half of an angular separation between adjacent teeth of the plurality of wobble teeth, as measured in an angular direction around the wobble axis.

18. The wobble plate drive system of claim 15, wherein each tooth of the plurality of wobble teeth has two engaging surfaces with each of the two engaging surfaces defined by a compound involute of a circle and an ellipse, the two engaging surfaces defining opposite sides of a wobble tooth.

19. The wobble plate drive system of claim 15, wherein the plurality of wobble teeth are configured such that contact forces exerted on the plurality of wobble teeth by the stator will be in directions substantially perpendicular to a line parallel to the wobble axis and radial lines extending from points of contact to the wobble axis.

20. The wobble plate drive system of claim 15, wherein the upper annular surface is a frustoconical surface configured so that a center of mass of the wobble plate is a vertex of the frustoconical surface.

* * * * *